US 12,503,258 B2

(12) United States Patent
Williams

(10) Patent No.: US 12,503,258 B2
(45) Date of Patent: Dec. 23, 2025

(54) APPARATUSES AND METHODS FOR DOSING LOOSE MATERIAL

(71) Applicant: Altria Client Services LLC, Richmond, VA (US)

(72) Inventor: Dwight David Williams, Powhatan, VA (US)

(73) Assignee: Altria Client Services LLC, Richmond, VA (US)

(*) Notice: Subject to any disclaimer, the term of this patent is extended or adjusted under 35 U.S.C. 154(b) by 314 days.

(21) Appl. No.: 17/836,127

(22) Filed: Jun. 9, 2022

(65) Prior Publication Data

US 2023/0399133 A1    Dec. 14, 2023

(51) Int. Cl.
| | | |
|---|---|---|
| *B65B 1/36* | (2006.01) | |
| *B65B 1/12* | (2006.01) | |
| *B65B 37/20* | (2006.01) | |
| *G01F 11/24* | (2006.01) | |
| *B65B 59/04* | (2006.01) | |

(52) U.S. Cl.
CPC ............... *B65B 1/366* (2013.01); *B65B 1/12* (2013.01); *B65B 37/20* (2013.01); *G01F 11/24* (2013.01); *B65B 59/04* (2013.01)

(58) Field of Classification Search
CPC  B65B 1/366; B65B 1/12; B65B 59/04; B65B 37/20; G01F 11/24
See application file for complete search history.

(56) References Cited

U.S. PATENT DOCUMENTS

| | | | |
|---|---|---|---|
| 3,704,816 A | | 12/1972 | Gandrud |
| 4,296,710 A * | | 10/1981 | Sillers, III ............. A01K 61/80 |
| | | | 119/51.11 |
| 4,889,077 A * | | 12/1989 | Possis .................. A01K 5/0291 |
| | | | 119/51.11 |
| 5,078,097 A * | | 1/1992 | Chisholm ............ A01K 5/0291 |
| | | | 119/51.13 |
| 5,303,672 A * | | 4/1994 | Morris .................. A01K 61/80 |
| | | | 222/650 |
| 6,964,355 B2 * | | 11/2005 | Landau .................. A47G 19/34 |
| | | | 222/367 |
| 7,237,699 B2 * | | 7/2007 | Zill ........................ B65B 1/366 |
| | | | 222/189.06 |
| 7,421,834 B1 | | 9/2008 | Doolan |
| 9,414,624 B2 | | 8/2016 | Carroll et al. |
| 10,448,669 B2 | | 10/2019 | Atchley et al. |
| 10,463,070 B2 | | 11/2019 | Carroll et al. |
| 12,163,818 B2 * | | 12/2024 | Williams .............. G01F 13/005 |
| 2003/0034085 A1 * | | 2/2003 | Spiers .................... B65B 1/366 |
| | | | 141/125 |
| 2013/0248563 A1 | | 9/2013 | Baker et al. |

FOREIGN PATENT DOCUMENTS

| | | |
|---|---|---|
| CN | 207556375 U | 6/2018 |
| DE | 20209156 U1 | 10/2002 |
| DE | 2020/20106079 U1 | 11/2020 |
| WO | WO-2004/063011 A1 | 7/2004 |

* cited by examiner

*Primary Examiner* — Frederick C Nicolas

(74) *Attorney, Agent, or Firm* — Harness, Dickey & Pierce, P.L.C.

(57) ABSTRACT

At least one example embodiment relates to an apparatus. In at least one example embodiment, the apparatus includes a shaft and a housing. The shaft is configured to rotate. The shaft defines a pocket. The housing includes a sidewall. The sidewall at least partially defines an interior region. At least a portion of the shaft is in the interior region. The sidewall defines a first opening to the interior region.

23 Claims, 14 Drawing Sheets

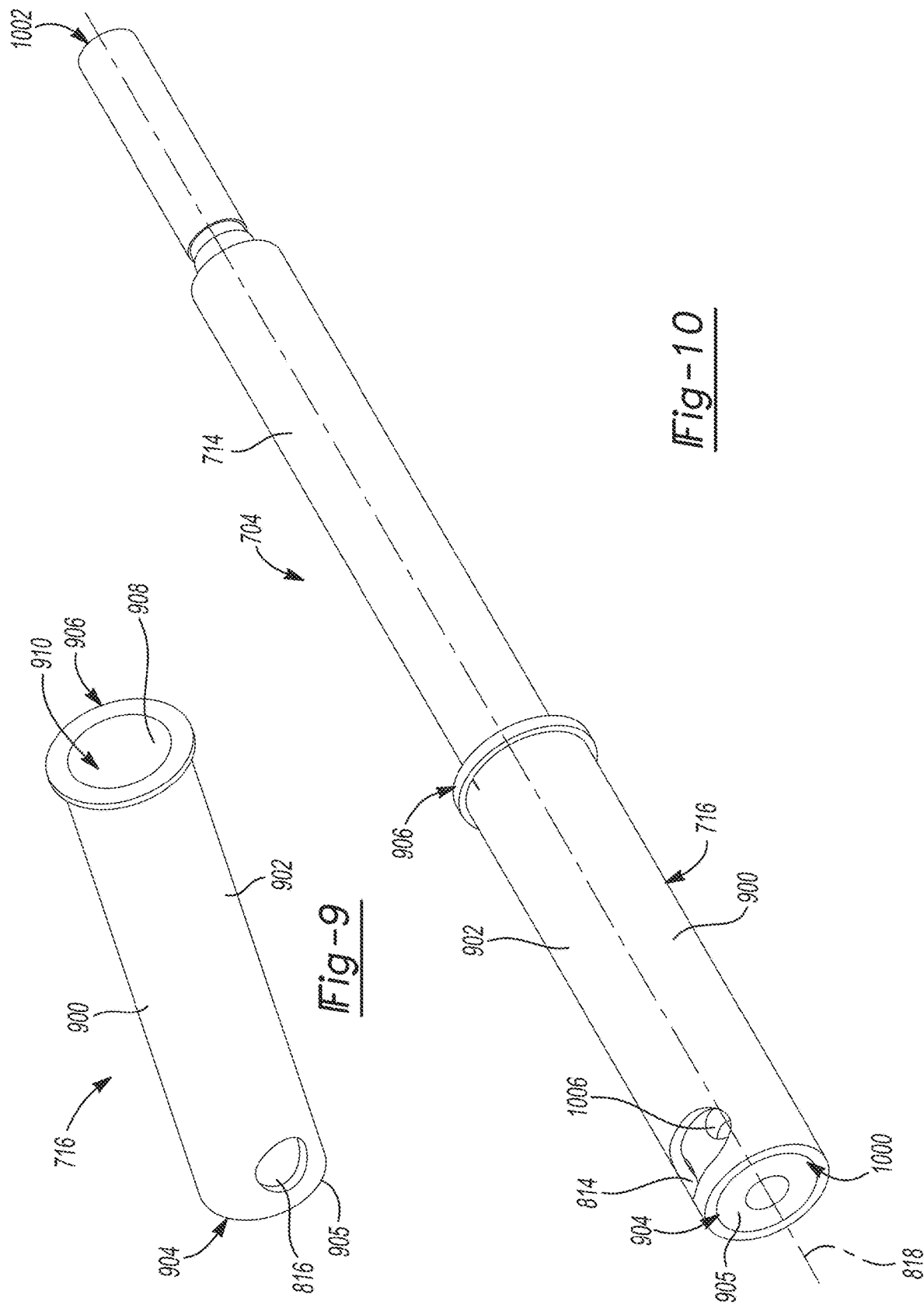

APPARATUSES AND METHODS FOR DOSING LOOSE MATERIAL

BACKGROUND

Field

The present disclosure relates to apparatuses and methods for dosing loose materials.

SUMMARY

At least one example embodiment relates to an apparatus.

In at least one example embodiment, the apparatus includes a shaft and a housing. The shaft is configured to rotate. The shaft defines a pocket. The housing includes a sidewall. The sidewall at least partially defines an interior region. At least a portion of the shaft is in the interior region. The sidewall defines a first opening to the interior region.

In at least one example embodiment, the shaft defines a plurality of pockets. The plurality of pockets includes the pocket.

In at least one example embodiment, the shaft includes the plurality of pockets equally spaced apart about a circumference of the shaft.

In at least one example embodiment, the shaft is configured such that as the shaft rotates each of the plurality of pockets comes into fluid communication with the first opening.

In at least one example embodiment, the shaft includes an axle an a tubular collar. The tubular collar at least partially surrounds the axle and defines the pocket.

In at least one example embodiment, the pocket is an aperture.

In at least one example embodiment, the tubular collar includes a plurality of tubular collars. The plurality of tubular collars is axially positioned along the axle.

In at least one example embodiment, each of the plurality of tubular collars is interlocked with another of the plurality of tubular collars.

In at least one example embodiment, the plurality of tubular collars is removably coupled to the axle.

In at least one example embodiment, the shaft defines a plurality of pockets including the pocket. The plurality of pockets includes a first set of circumferentially-spaced pockets at a first axial location and a second set of circumferentially-spaced pockets at a second axial location different from the first axial location.

In at least one example embodiment, the tubular collar is fixed to the axle and configured to rotate together with the axle.

In at least one example embodiment, the sidewall is a cylindrical sidewall. The sidewall further defines a second opening. The apparatus is configured such that as the shaft rotates, the pocket sequentially comes into fluid communication with the first opening and the second opening.

In at least one example embodiment, the housing is a hopper. The sidewall defines a triangular cross section. The shaft is at a vertex of the triangular cross section.

At least one example embodiment relates to an apparatus.

In at least one example embodiment, the apparatus includes a shaft and a housing. The shaft defines a pocket. The housing includes a sidewall defining an interior region. At least a portion of the shaft is in the interior region. The sidewall defines a first opening to the interior region. The shaft is configured to rotate with respect to the housing through a first position in which the pocket is in fluid communication with the interior region and a second position in which the pocket is in fluid communication with the first opening.

In at least one example embodiment, the shaft defines a plurality of pockets including the pocket.

In at least one example embodiment, the shaft includes the plurality of pockets angularly spaced apart at a common axial location.

In at least one example embodiment, the sidewall is a cylindrical sidewall. The sidewall further defines a second opening. In the first position, the pocket is in fluid communication with the interior region through the first opening.

In at least one example embodiment, the housing is a hopper. The sidewall defines a triangular cross section. The shaft is at a vertex of the triangular cross section.

At least one example embodiment relates to an apparatus.

In at least one example embodiment, the apparatus includes an axle and a tubular collar. The axle is configured to rotate through a first position and a second position. The tubular collar is coupled to the axle and configured to rotate together with the axle. The tubular collar defines a plurality of pockets.

In at least one example embodiment, the tubular collar includes the plurality of pockets angularly spaced apart at a common axial location.

In at least one example embodiment, the plurality of pockets includes 4 pockets spaced 90° apart about the tubular collar.

In at least one example embodiment, the tubular collar includes the plurality of pockets axially spaced apart.

In at least one example embodiment, the plurality of pockets includes a first set of pockets and a second set of pockets. The first set of pockets is angularly spaced apart at a first axial location. The second set of pockets angularly spaced apart at a second axial location different from the first axial location.

At least one example embodiment relates to a method of filling a plurality of pouches with a material.

In at least one example embodiment, the method includes providing a first pouch of the plurality of pouches. The method further includes rotating a shaft to a first position such that a first portion of the material is deposited into a first pocket defined by the shaft. The method further includes rotating the shaft to a second position different from the first position such that the first portion of the material is discharged from the first pocket to the first pouch.

In at least one example embodiment, the rotating the shaft to the second position includes retaining the first portion of the material within the first pocket by engagement with a housing at least partially surrounding the shaft.

In at least one example embodiment, the method further includes rotating the shaft such that a second portion of the material is deposited into a second pocket defined in the shaft.

In at least one example embodiment, the rotating the shaft to the second position causes the second portion of the material to be deposited into the second pocket.

In at least one example embodiment, the method further includes providing a second pouch of the plurality of pouches. The method further includes rotating the shaft to the first position such that the second portion of the material is discharged from the second pocket to the second pouch.

In at least one example embodiment, the first pocket and the second pocket are axially spaced apart along the shaft. The rotating the shaft to the first position causes the first portion of the material to be deposited into the first pocket and the second portion of the material to be deposited into the second pocket.

In at least one example embodiment, the method further includes providing a second pouch of the plurality of pouches. The rotating the shaft to the second position causes the second portion of the material to be discharged from the second pocket to the second pouch.

In at least one example embodiment, the rotating the shaft to the second position includes rotating the shaft 180°.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 9 is a back bottom perspective view of a housing of a dosing assembly of FIG. 7 according to at least one example embodiment.

FIG. 10 is a front top perspective view of the dosing assembly of the apparatus of FIG. 7 according to at least one example embodiment.

DETAILED DESCRIPTION OF EXAMPLE EMBODIMENT

Figure 1:
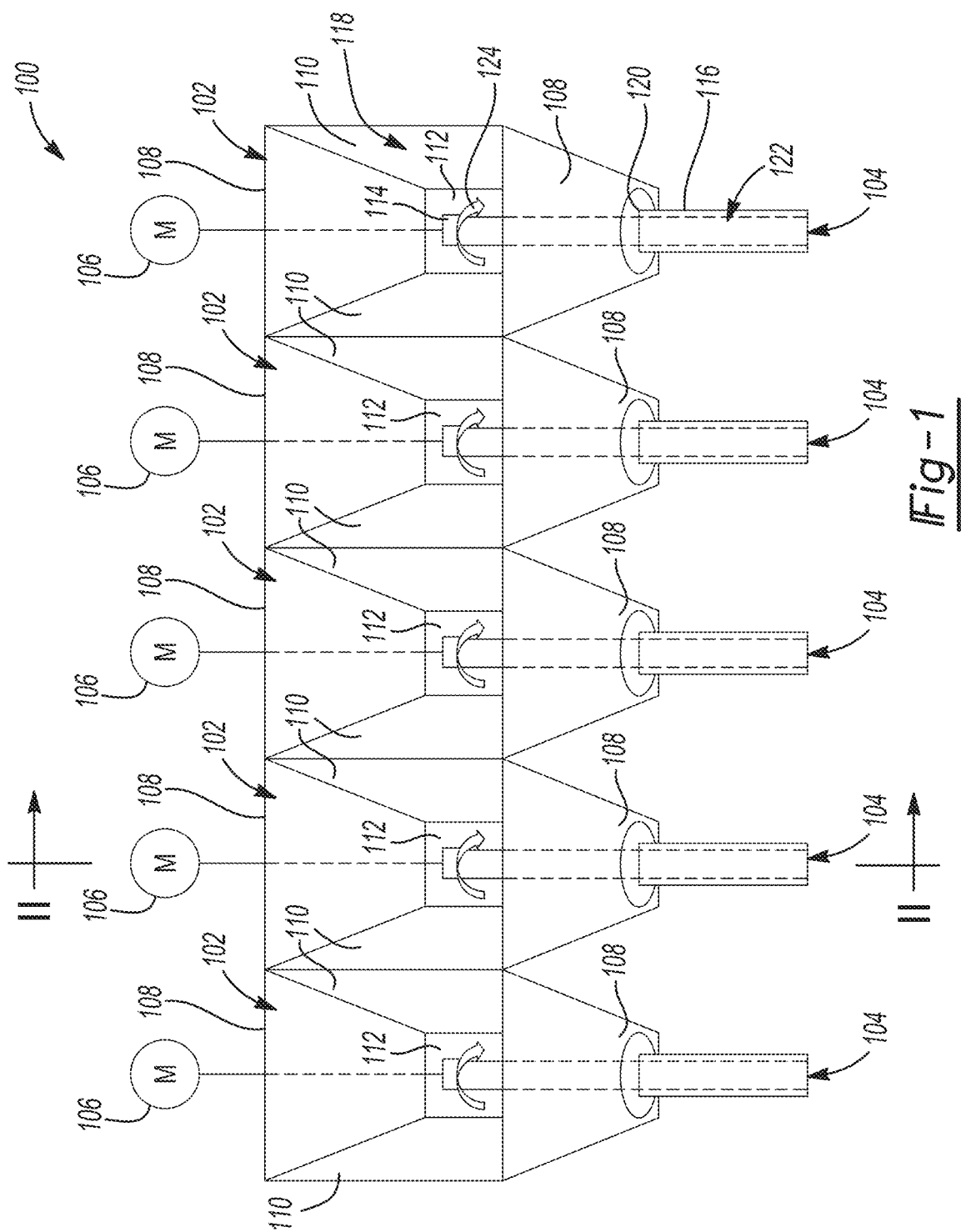
FIG. 1 is a top front schematic view of an apparatus for dosing a loose material according to at least one example embodiment.

Some detailed example embodiments are disclosed herein. However, specific structural and functional details disclosed herein are merely representative for purposes of describing some example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below"

or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements and/or groups thereof.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations and variations in shapes.

When the words "about" and "substantially" are used in this specification in connection with a numerical value, it is intended that the associated numerical value include a tolerance of ±10% around the stated numerical value, unless otherwise explicitly defined. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a top front schematic view of an apparatus for dosing a loose material according to at least one example embodiment.

At least one example embodiment relates to an apparatus or station 100 for dosing a loose material, as shown in FIG. 1. The apparatus 100 may be part of a pouching and/or packaging apparatus or used together with a pouching and/or packaging apparatus, as will be discussed in relation to FIGS. 19-20, below. The apparatus 100 generally includes one or more hoppers 102 for containing the loose material, one or more dosing assemblies 104 to portion or dose the loose material, and motors 106 operatively connected to each of the respective dosing assemblies 104 to rotate a portion of each of the dosing assemblies 104.

In at least one example embodiment, each of the dosing assemblies 104 may be associated with a single hopper 102, as shown. Each of the hoppers 102 may include a peripheral wall include a first pair of opposing walls 108 (e.g., front and back walls) and a second pair of opposing walls 110 (e.g., side walls), and a floor 112. The walls 108, 110 may be configured to cooperate with gravity to guide loose material contained by the hopper 102 toward the floor 112. The first pair of walls 108 and/or the second pair of walls 110 may be configured to act as a funnel for material contained by the hopper 102. In at least one example embodiment, as shown, the hopper 102 has a triangular or isosceles trapezoidal cross section. The second pair of walls 110 may be angled such that they are closest to one another at the floor 112, as shown. In the example embodiment shown, each hopper 102 includes a distinct, non-shared peripheral wall (e.g., including the first and second pairs of opposing side walls 108, 110). In at least one other example embodiment, one or more walls (e.g., second side walls 110) are shared between adjacent hoppers. In at least one other example embodiment, two or more dosing assemblies 104 (e.g., all of the dosing assemblies 104) share a single hopper.

In at least one example embodiment, each of the dosing assemblies 104 includes an auger 114 and a housing 116, as will be described in greater detail below in relation to FIGS. 2-5. The housing 116 may be fixed to the hopper 102. In at least one example embodiment, the housing 116 may be at and/or adjacent to the floor 112 (above or below), such as at or adjacent to a vertex of a triangular cross section of the hopper 102 or a short end of an isosceles trapezoidal cross section of the hopper 102. The auger 114 may extend from an interior region 118 of the hopper 102, through a first or hopper aperture 120 in one of the first pair of side walls 108, to an interior region or chamber 122 of the housing 116. The auger 114 may be operatively connected to a motor 106 such that it is configured to be rotated with respect to the hopper 102 and the housing 116 by the motor 106, as shown at 124.

In at least one example, each dosing assembly 104 is independently operatively connected to one of the motors 106. Accordingly, a quantity of motors 106 may be equal to a quantity of dosing assemblies 104. The motors 106 may be configured to rotate the augers 114 concurrently, sequentially, or in any other desired operation. Operation of the motors 106 may be timed such that dosing of the loosing material from different dosing assemblies 104 is concurrent, sequential, or any other desired (or alternatively, predetermined) pattern.

Figure 2:
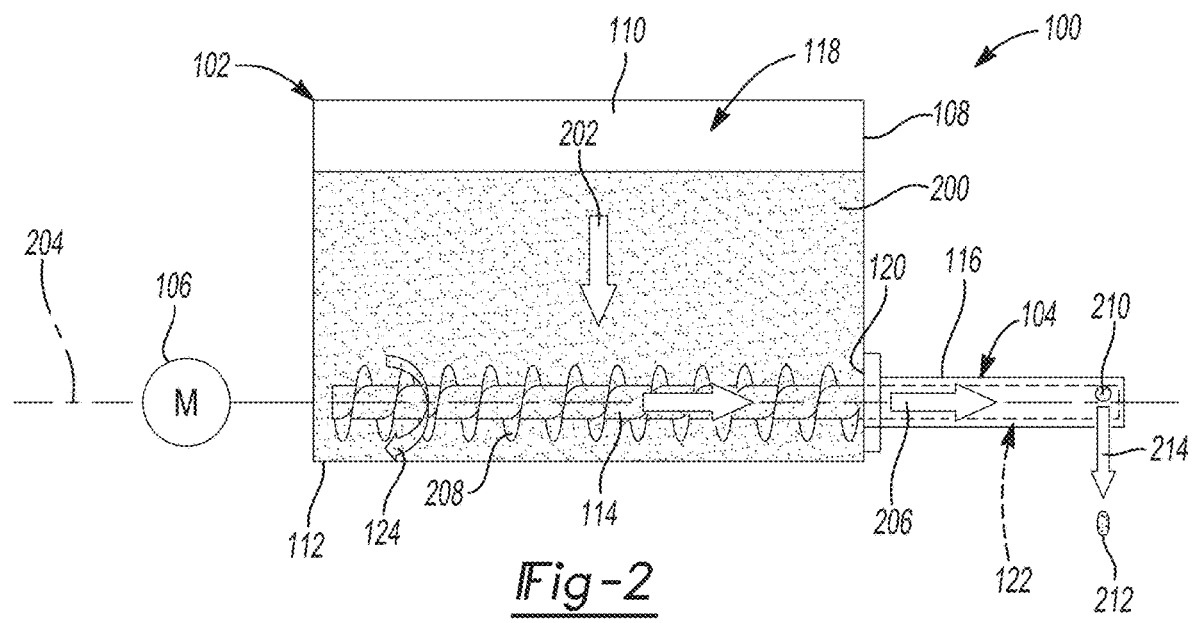
FIG. 2 is a plan view of the apparatus of FIG. 1 at the cross section defined along line II-II of FIG. 1 according to at least one example embodiment.

FIG. 2 is a plan view of the apparatus of FIG. 1 at the cross section defined along line II-II of FIG. 1 according to at least one example embodiment.

As shown in FIG. 2, each of the hoppers 102 may be configured to contain loose material 200, as will be described in greater detail below in relation to FIGS. 19-20. A portion of the loose material 200 may be in contact with the auger 114. As the loose material 200 is dispensed, remaining loose material 200 may come into contact with the auger 114, such as under the influence of gravity and guided by a funnel shape of the hopper 102, as indicated at 202. Additionally or alternatively, in at least one other example embodiment, the loose material 200 may be moved toward the auger 114 by another mechanism, such as an agitator (see, e.g., agitator 802 in FIG. 8).

The motor 106 may be configured to rotate the auger 114 about an auger axis 204, as described above. The auger 114 may be configured to move a portion of the loose material 200 toward the housing 116 as it rotates, as shown at 206. In at least one example embodiment, the auger 114 includes a helical thread 208 configured to engage and move the loose material 200. The auger 114 may move the loose material 200 from the hopper 102 to the chamber 122 of the housing 116. The housing 116 may define a first opening 210, as will be described below in relation to FIGS. 3-5. A desired (or alternatively, predetermined) portion 212 of the loose material 200 may be discharged from the first opening 210, as shown at 214.

Figure 3:
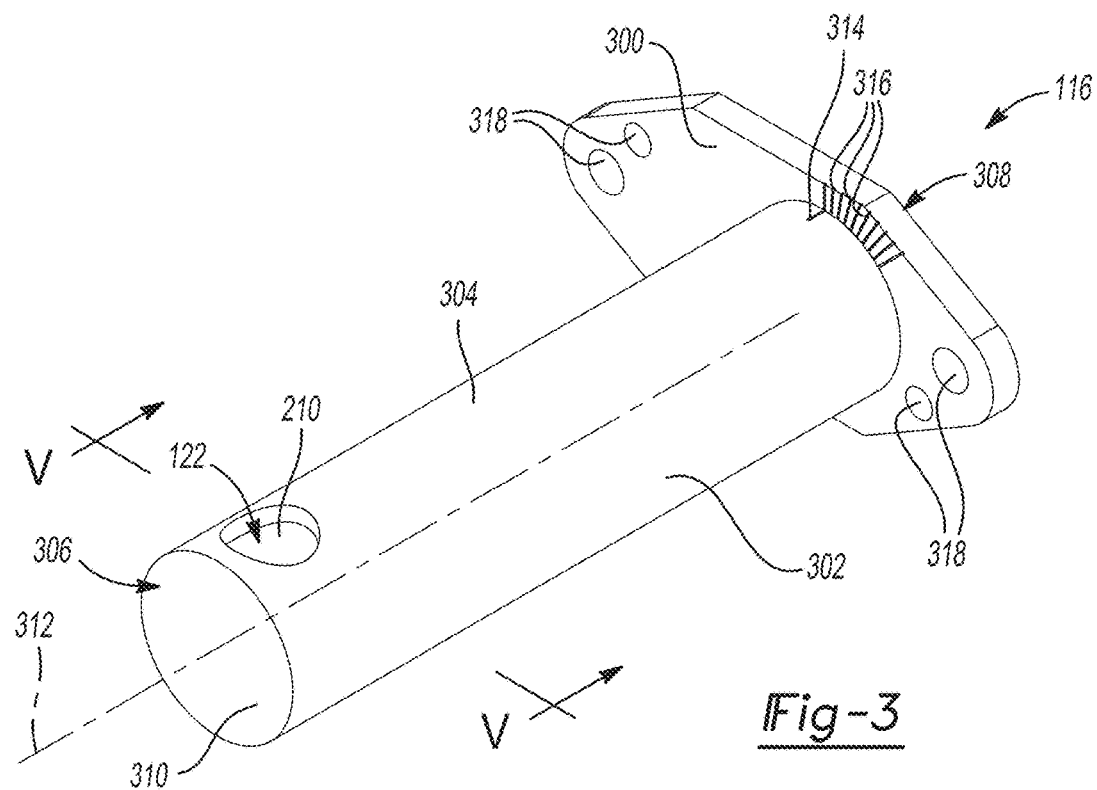
FIG. 3 is a front perspective view of a dosing tube of the apparatus of FIG. 1 according to at least one example embodiment.

FIG. 3 is a front perspective view of a dosing tube of the apparatus of FIG. 1 according to at least one example embodiment.

As shown in FIG. 3, in at least one example embodiment, the housing 116 includes a plate 300 and a tube 302 (also referred to as the "dosing tube 302"). The tube 302 includes a sidewall 304. The sidewall 304 may be generally cylindrical. In at least one example embodiment, the sidewall 304 may be referred to as a cylindrical sidewall.

The sidewall 304 may extend between a first end 306 and a second end 308 opposite the first end 306. The second end 308 may be coupled to the plate 300. The first end 306 may be closed. Accordingly, the housing 116 may include an end wall 310 at the first end 306 of the cylindrical sidewall 304.

In at least one example embodiment, the sidewall 304 defines the first opening 210. The first opening 210 may be closer to the first end 306 than the second end 308. In at least one example embodiment, the first opening 210 may be adjacent to the first end 306 and the end wall 310 such that substantially all the loose material 200 (shown in FIG. 2) that enters the chamber 122 is discharged from the first opening 210.

In at least one example embodiment, the tube 302 is configured to be rotated about a housing axis 312 with respect to the plate 300. In at least one example embodiment, the tube 302 is configured to be manually rotated. The housing axis 312 may be colinear with the auger axis 204 (shown in FIG. 2). In at least one example embodiment, the tube 302 is configured to rotate in a desired (or alternatively, predetermined) increment with respect to the plate 300. In at least one example embodiment, the desired increment may be greater than or equal to about 0.5° (e.g., greater than or equal to about 1°, greater than or equal to about 2°, greater than or equal to about 3°, greater than or equal to about 4°, greater than or equal to about 5° greater than or equal to about 6°, greater than or equal to about 7°, greater than or equal to about 8°, greater than or equal to about 9°, or greater than or equal to about 10°). In at least one example embodiment, the desired increment may be less than or equal to about 15° (e.g., less than or equal to about 10°, less than or equal to about 9°, less than or equal to about 8°, less than or equal to about 7°, less than or equal to about 6°, less than or equal to about 5°, less than or equal to about 4°, less than or equal to about 3°, less than or equal to about 2°, or less than or equal to about 1°).

In at least one other example embodiment, the tube 302 is configured to freely rotate with respect to the plate. The housing 116 may include a locking mechanism (not shown) to fix an angular position of the tube 302 with respect to the plate 300.

In at least one example embodiment, the housing 116 includes first and second indicia 314, 316 to indicate an angular position or a degree of rotation of the tube 302 with respect to the plate 300. The indicia 314, 316 may include tick marks, as shown. The first indicum 314 may be present on the tube 302 and the second indicia 316 may be present on the plate 300. The second indicia 316 may be angularly spaced apart at the desired increment. Alignment of the first indicum 314 with one of the second indicia 316 may indicate the angular position of the tube 302 with respect to the plate 300. Additionally or alternatively, first and/or second indicia may include numerals, letters, dots, symbols, a color grading, embossing, debossing, or any other suitable marking.

In at least one example embodiment, the plate 300 is configured to be coupled to an outside of the hopper 102 (shown in FIGS. 1-2). In at least one example embodiment, the plate 300 may define a plurality of second or fastener apertures 318. A respective plurality of fasteners (not shown) may extend through the fastener apertures 318 in the plate 300 and into receptacles (not shown) one of the first pair of side walls 108 (shown in FIG. 1) of the hopper 102 to couple the housing 116 to the hopper 102. Returning to FIG. 2, when the housing 116 is coupled to the hopper 102, the chamber 122 of the housing 116 is in fluid communication with the interior region 118 of the hopper 102 via the hopper aperture 120.

Figure 4:
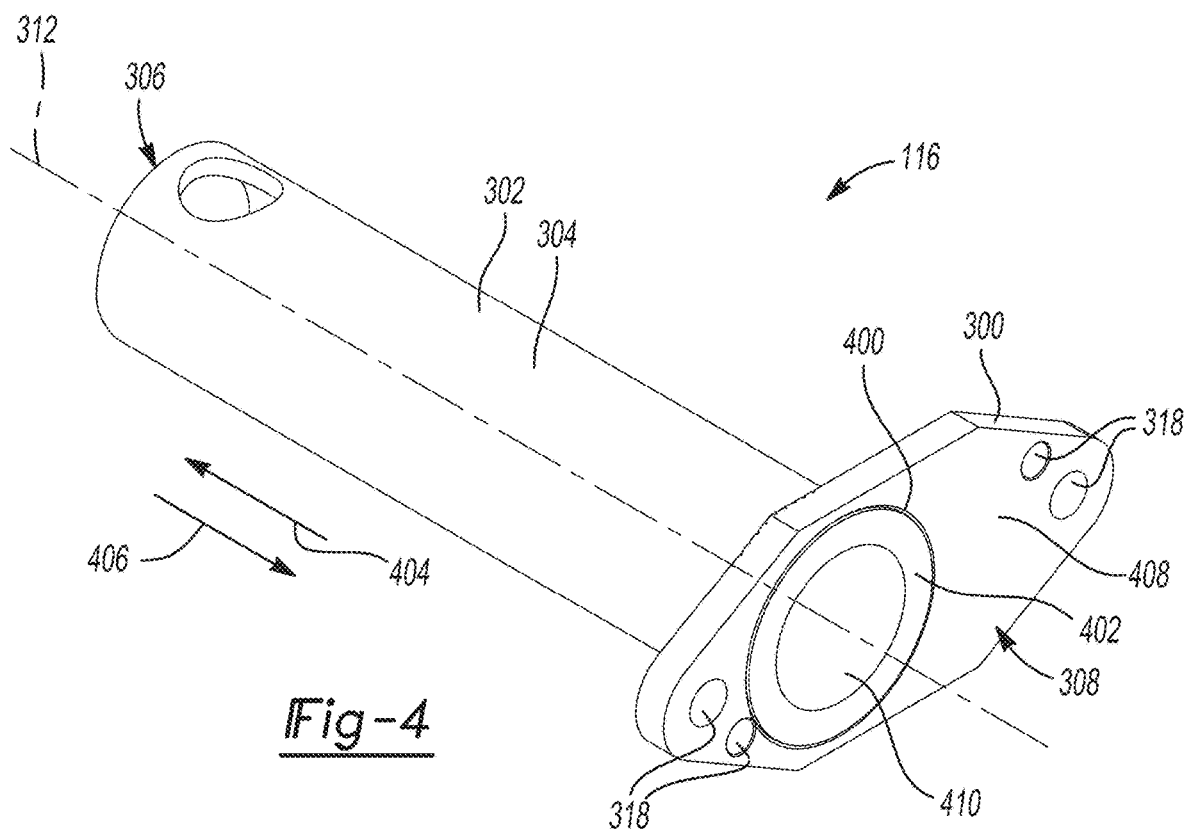
FIG. 4 is a back perspective view of the dosing tube of FIG. 3 according to at least one example embodiment.

FIG. 4 is a back perspective view of the dosing tube of FIG. 3 according to at least one example embodiment.

In at least one example embodiment, as shown in FIG. 4, at least a portion of the tube 302 extends into a third or tube aperture 400 in the plate 300. In at least one example embodiment, the tube 302 may include a radially-outwardly-extending flange 402 at the second end 308. The flange 402 may reduce or prevent translation of the tube 302 with respect to the plate 300 in a first direction 404. Engagement of the flange 402 with one of first pair of side walls 108 (shown in FIGS. 1-2) of the hopper 102 (shown in FIGS. 1-2) may reduce or prevent translation of the tube 302 with respect to the plate 300 in a second direction 406 opposite the first direction 404.

In at least one example embodiment, the second end 308 of the tube 302 may be flush with a back surface 408 of the plate 300. The second end 308 of the tube 302 defines a second opening 410 that provides access to the chamber 122 in at least one example embodiment. The chamber 122 may be configured to receive the auger 114 via the second opening 410.

Figure 5:
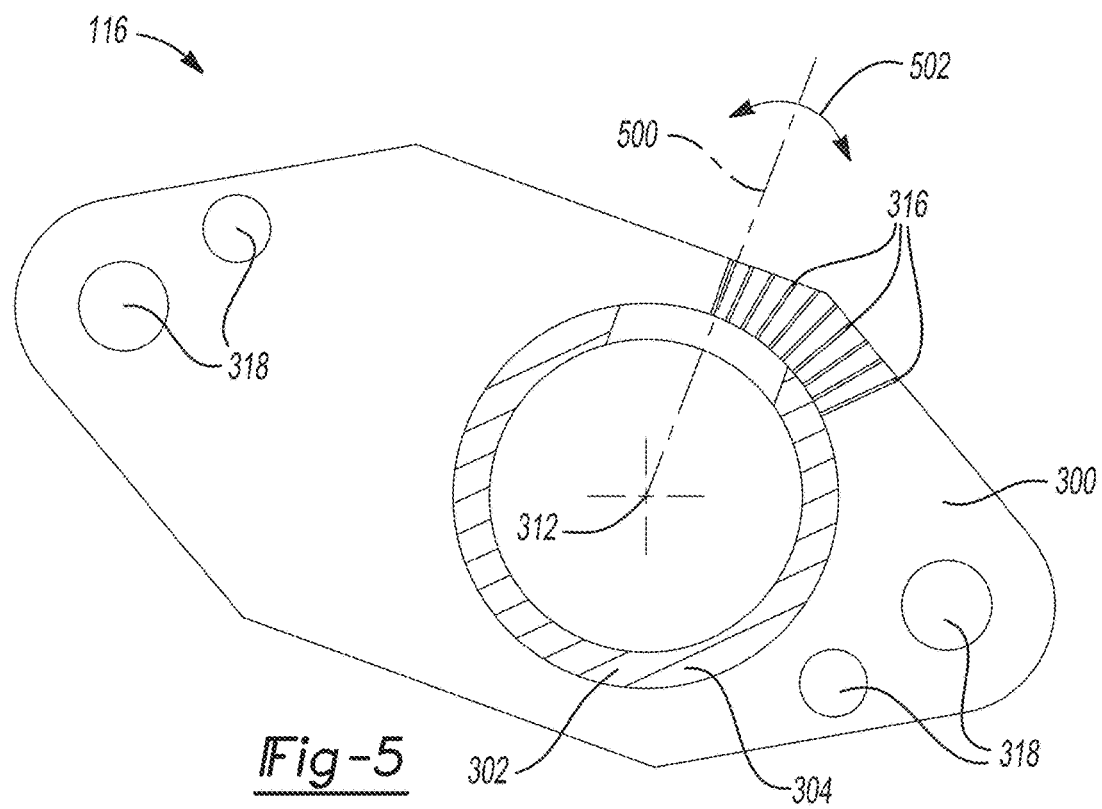
FIG. 5 is a cross sectional view of the dosing tube of FIG. 3 along line V-V of FIG. 3.

FIG. 5 is a cross sectional view of the dosing tube of FIG. along line V-V of FIG. 3 according to at least one example embodiment.

As shown in FIG. 5, the sidewall 304 defines the first opening 210. The first opening 210 defines a central axis 500 that is generally perpendicular to the auger axis 204 (shown in FIG. 2) and the housing axis 312. As described above, an angular position of the first opening 210 about the housing axis 312 is adjustable. A desired (or alternatively, predetermined) angular position of the first opening 210 may be selected based on an angle of repose of the loose material 200 (shown in FIG. 2) to facilitate discharge of the loose material 200 from the housing 116. As used herein, the "angle of repose" means the steepest angle at which a sloping surface formed by the loose material 200 is stable. Different loose materials 200 (e.g., having different compositions, sizes, and/or shapes) may have different material characteristics and corresponding different angles of repose. Accordingly, angular adjustment of the tube 302 to set an angular position of the first opening 210 may provide a simple and efficient modification to the dosing assembly 104 (shown in FIGS. 1-2) to facilitate controlled, discrete dosing of different loose materials 200.

Figure 6:
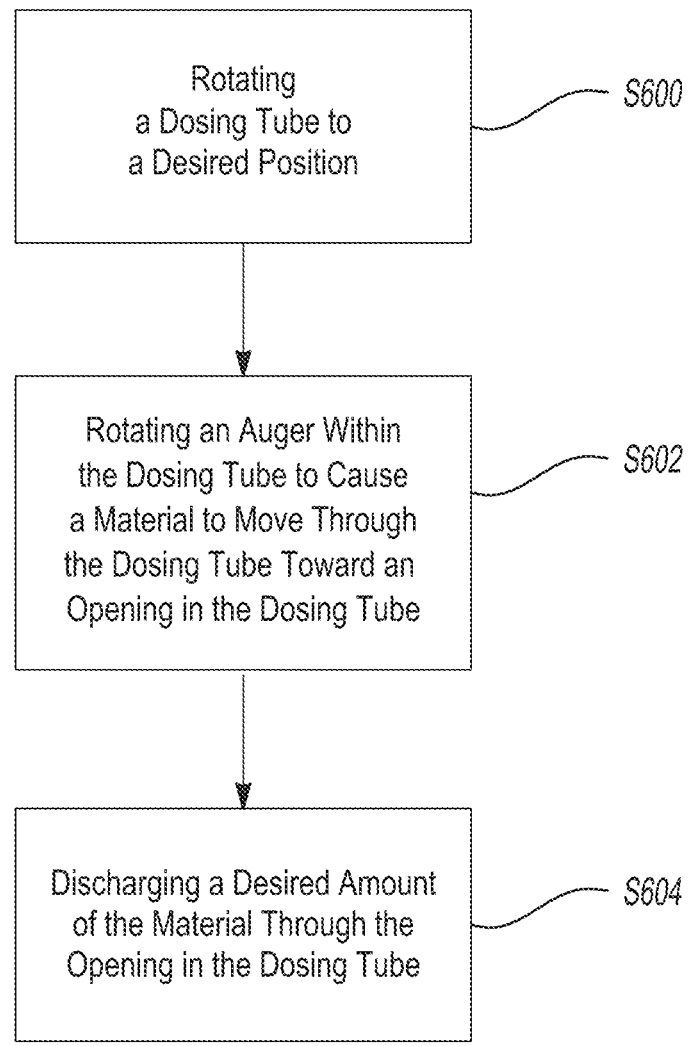
FIG. 6 is a flowchart depicting a method of dosing a loose material according to at least one example embodiment.

FIG. 6 is a flowchart depicting a method of dosing a loose material according to at least one example embodiment.

As shown in FIG. 6, in at least one example embodiment, the method generally includes rotating the tube 302 to a desired (or alternatively, predetermined) position at S600; rotating the auger 114 within the tube 302 to cause the loose material 200 to move through the tube 302 toward the first opening 210 in the tube 302 at S602; and discharging a desired (or alternatively, predetermined) amount or dose of the loose material 200 through the first opening 210 in the tube 302 at S604. Each of these steps is described in greater detail below.

At S600, in at least one example embodiment, the method includes rotating the tube 302 to the desired angular position. As described above in relation to FIG. 5, the desired angular position may be selected based on the angle of repose of the loose material 200. Rotating the tube 302 may include engaging the tube 302 (e.g., manually) and rotating the tube 302 about the housing axis 312 while the plate 300 and the hopper 102 remain generally stationary. In at least one example embodiment, the method further includes fixing the angular position of the tube 302 with respect to the plate 300, such as with a locking mechanism. In at least one example embodiment, the angular position of the tube 302 is retained due to friction between the plate 300 and the tube 302.

At S602, in at least one example embodiment, the method includes rotating the auger 114 within the chamber 122 of the housing 116. In at least one example embodiment, rotating the auger 114 at S602 may include rotating the auger 114 at least 360° about the auger axis 204. Rotating the auger 114 at S602 may facilitate movement of the loose material 200 from the interior region 118 of the hopper 102 to the chamber 122 of the housing 116, from the second end 308 of the housing 116 toward the first end 306 of the housing 116. A portion of the loose material 200 may engage the end wall 310 of the housing 116.

At S604, in at least one example embodiment, the method may include discharging a desired amount or dose of the loose material 200 through the first opening 210 in the tube 302. Discharging the loose material 200 may include rotating the auger 114 about the auger axis 204. When the loose material 200 reaches the first end 306 of the housing 116, continued rotation of the auger 114 may force the loose material 200 to be discharged from the first opening 210. The loose material 200 may be discharged in a controlled, discrete dose due to the angular position of the first opening 210.

In at least one example embodiment, the method includes the rotating at S602 and the discharging at S604 to provide a desired (or alternatively, predetermined) quantity of doses. In at least one example embodiment, the desired quantity of doses corresponds to a plurality of pouches, as will be described in greater detail below in relation to FIG. 19.

Figure 7:
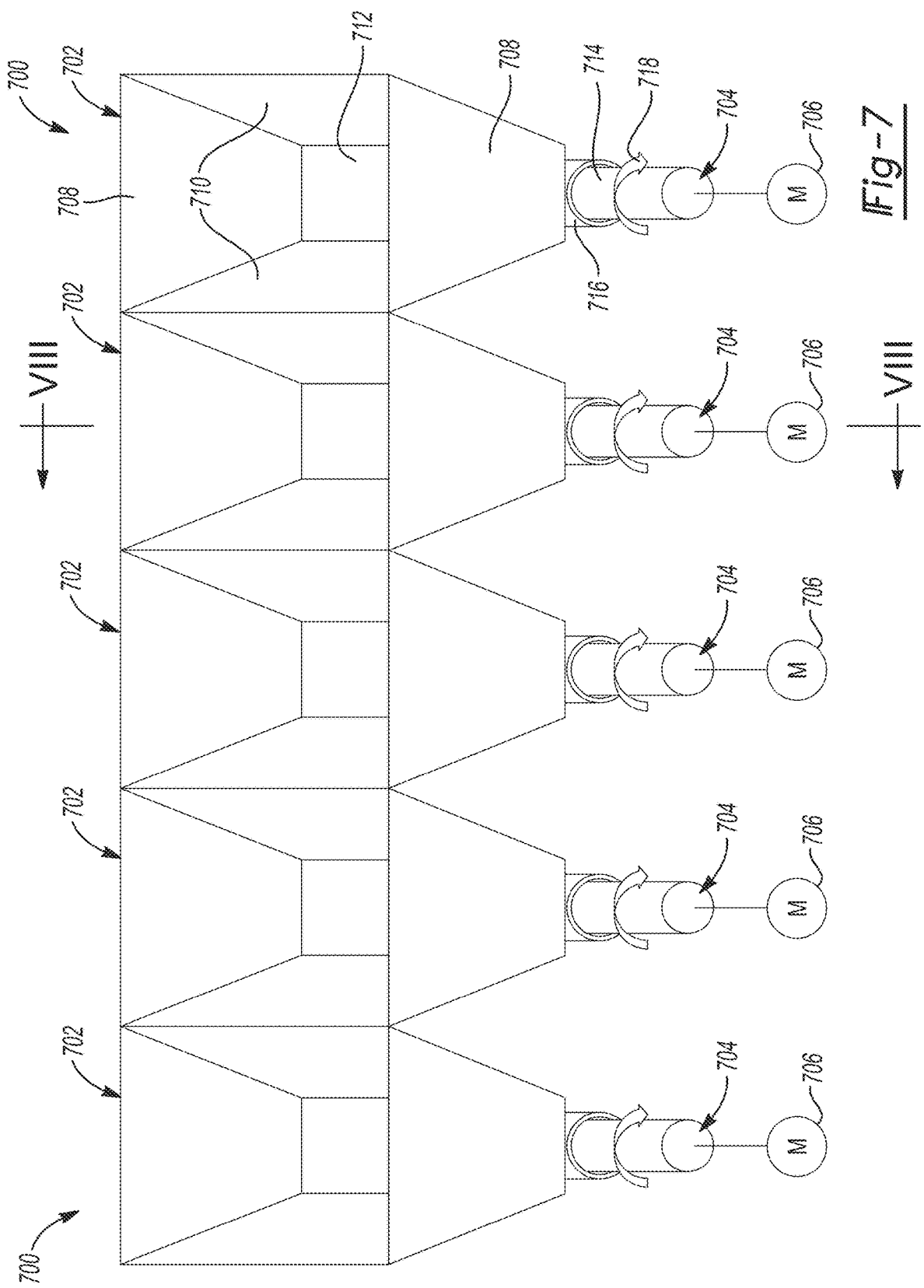
FIG. 7 is a top back schematic view of an apparatus for dosing loose material according to at least one example embodiment.

FIG. 7 is a top back schematic view of an apparatus for dosing loose material according to at least one example embodiment.

At least one example embodiment relates to an apparatus or station 700 for dosing a loose material, as shown in FIG. 7. The apparatus 700 may be part of a pouching and/or packaging apparatus or used together with a pouching and/or packaging apparatus, as will be discussed in relation to FIGS. 19-20, below. The apparatus 700 generally includes one or more hoppers 702 for containing the loose material, one or more dosing assemblies 704 to portion or dose the loose material, and motors 706 operatively connected to each of the respective dosing assemblies 704 to rotate a portion of each of the dosing assemblies 704.

In at least one example embodiment, each of the dosing assemblies 704 may be associated with a single hopper 702, as shown. Each of the hoppers 702 may include a peripheral wall include a first pair of opposing walls 708 (e.g., front and back walls) and a second pair of opposing walls 710 (e.g., side walls), and a floor 712. The walls 708, 710 may be configured to cooperate with gravity to guide loose material contained by the hopper 702 toward the floor 712. The first pair of walls 708 and/or the second pair of walls 710 may be configured to act as a funnel for material contained by the hopper 702. In at least one example embodiment, as shown, the hopper 702 has a triangular or isosceles trapezoidal cross section. The second pair of walls 710 may be angled such that they are closest to one another at the floor 712, as shown. In the example embodiment shown, each hopper 702 includes a distinct, non-shared peripheral wall (e.g., including the first and second pairs of opposing side walls 708, 710). In at least one other example embodiment, one or more walls (e.g., second side walls 710) are shared between adjacent hoppers. In at least one other example embodiment, two or more dosing assemblies 704 (e.g., all of the dosing assemblies 704) share a single hopper.

In at least one example embodiment, each of the dosing assemblies 704 includes a shaft 714 and a housing 716, as will be described in greater detail below in relation to FIGS. 8-12. The housing 716 may be fixed to the hopper 702. In at least one example embodiment, as shown, the dosing assembly 704 may be at and/or adjacent to a vertex of the triangular cross section of the hopper 702 or a short side of the isosceles trapezoidal cross section of the hopper 702. In at least one example embodiment, the housing 716 is fixed to the floor 712 of the hopper 702. The housing 716 may be fixed to a bottom of the floor 712 as shown, or alternatively to a top of the floor 112 such that it is at least partially inside of the hopper 702. Each of the shafts 714 may be operatively connected to a respective one of the motors 706 such that it is configured to be rotated with respect to the hopper 702 and the housing 716 by the motor 706, as shown at 718.

In at least one example, each dosing assembly 704 is independently operatively connected to one of the motors 706. Accordingly, a quantity of motors 706 may be equal to a quantity of dosing assemblies 704. The motors 706 may be configured to rotate the shafts 714 concurrently, sequentially, or in any other desired operation. Operation of the motors 706 may be timed such that dosing of the loose material from different dosing assemblies 704 is concurrent, sequential, or any other desired (or alternatively, predetermined) pattern.

Figure 8:
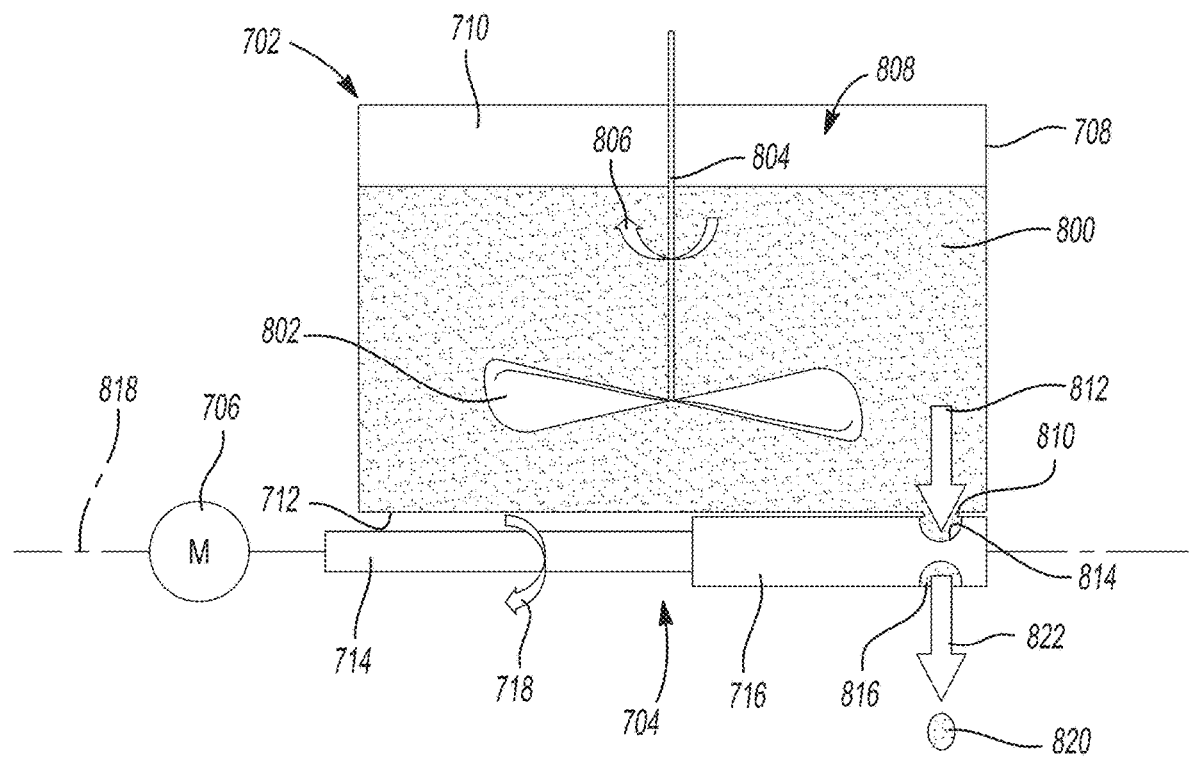
FIG. 8 is a plan view of the apparatus of FIG. 7 at the cross section defined along line VIII-VIII of FIG. 7 according to at least one example embodiment.

FIG. 8 is a plan view of the apparatus of FIG. 7 at the cross section defined along line VIII-VIII of FIG. 7 according to at least one example embodiment.

In at least one example embodiment, as shown in FIG. 8, each of the hoppers 702 may be configured to contain loose material 800, as will be described in greater detail below in relation to FIGS. 19-20. A portion of the loose material 800 may be in contact with an agitator 802 connected to an agitator shaft 804. The agitator shaft 804 may be configured to rotate the agitator 802 as indicated by 806. The agitator shaft 804 may be driven (e.g., rotated) by any suitable actuator, such as an electric motor (not shown). The agitator 802 operates to break up the loose material 800 held in an interior region 808 of the hopper 702. The agitator 802 may also move the loose material from the interior region 808 toward an aperture 810 in the floor 712 of the hopper 702, as indicated by 812, to be discharged to the dosing assembly 704. Additionally or alternatively, in at least one other example embodiment, the loose material 800 may be dispensed through the aperture 810 by another mechanism, such as under the influence of gravity.

In at least one example embodiment, each of the dosing assemblies 704 may extend under the floor 712 such that it is in fluid communication with a respective one of the hoppers 702. Additionally or alternatively, in at least one other example embodiment, each of the dosing assemblies 704 may extend within the interior region 808 of the respective hopper 702 (not shown). In the at least one such example embodiment, the hopper 702 may be configured as a housing (see, e.g., hopper 1406 of FIGS. 14-16) such that the housing 716 may be eliminated.

In at least one example embodiment, the housing 716 may define a first opening 814 and a second opening 816 opposite the first opening 814, as will be described below in relation to FIGS. 9-10. The first opening 814 may be configured to be positioned adjacent the aperture 810 such that the first opening 814 may receive the loose material 800 through the aperture 810.

The motor 706 may be configured to rotate the shaft 714 about a shaft axis 818, as described above. The shaft 714 may be configured to move a portion of the loose material 800 received by the first opening 814 of the housing 716 to the second opening 816 of the housing 716 as it rotates, which will be described in greater detail below in relation to FIGS. 11-12. A desired (or alternatively, predetermined) portion 820 of the loose material 800 may be discharged from the second opening 816, as shown at 822.

FIG. 9 is a back bottom perspective view of a housing of the dosing assembly of FIG. 7 according to at least one example embodiment.

As shown in FIG. 9, in at least one example embodiment, the housing 716 includes a tube 900 (also referred to as the "dosing tube 900"). The tube 900 includes a sidewall 902. The sidewall 902 may be generally cylindrical. In at least one example embodiment, the sidewall 902 may be referred to as a cylindrical sidewall.

The sidewall 902 may extend between a first end 904 and a second end 906 opposite the first end 904. The first end 904 may be closed. Accordingly, the housing 716 may include an end wall 905 at the first end 904 of the cylindrical sidewall 902 (also shown in in FIG. 10).

In at least one example embodiment, the sidewall 902 defines the first opening 814 (shown in FIGS. 8 and 10) and the second opening 816. The first opening 814 and the second opening 816 may be closer to the first end 904 than the second end 906. In at least one example embodiment, the second opening 816 is opposite the first opening 814. For example, the first opening 814 and the second opening 816 may be adjacent the first end 904 and positioned about 180 degrees apart about the sidewall 902.

In at least one example embodiment, the second end 906 of the tube 900 defines a third opening 908 that provides access to an interior region 910 of the tube 900. The interior region 910 may be configured to receive the shaft 714 via the third opening 908.

FIG. 10 is a front top perspective view of a dosing assembly of the apparatus of FIG. 7 according to at least one example embodiment.

As shown in FIG. 10, in at least one example embodiment, the dosing assembly 704 includes the shaft 714 and the housing 716. The shaft 714 extends between a first end 1000 and a second end 1002 opposite the first end 1000. The first end 1000 of the shaft 714 may be configured to be inserted into the housing 716. In at least one example embodiment, the first end 1000 of the shaft 714 may be flush with an interior surface of the end wall 905 of the housing 716.

In at least one example embodiment, the shaft 714 includes an aperture or one or more pockets 1006. The pockets 1006 may be closer to the first end 1000 than the second end 1002 of the shaft 714. In at least one example embodiment, the pockets 1006 may be adjacent to the first end 1000 and the first opening 814 in the housing 716 such that the pockets 1006 are configured to receive the loose material 800 (shown in FIG. 8) through the first opening 814 and discharges the loose material 800 from the aperture 810.

In at least one example embodiment, the shaft 714 is configured to be rotated about the shaft axis 818. As the shaft rotates, the loose material 800 is held within one of the pockets 1006 by an interior surface of the sidewall 902. The loose material within the pocket 1006 is discharged from the second opening 816 (shown in FIG. 8) as the shaft 714 rotates and the pocket 1006 rotates into alignment or fluid communication with the second opening 816.

Figure 11A:
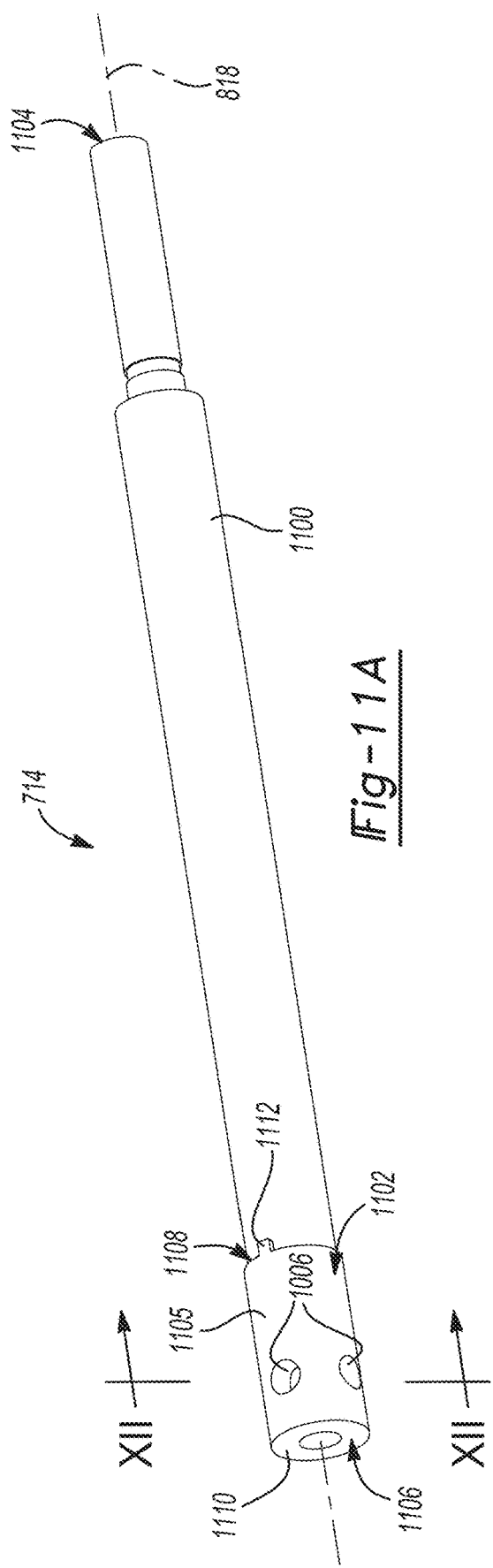
FIG. 11A is a perspective view of a shaft of the dosing assembly of FIG. 10 according to at least one example embodiment.

FIG. 11A is a perspective view of a shaft of the dosing assembly of FIG. 10 according to at least one example embodiment.

Figure 11B:
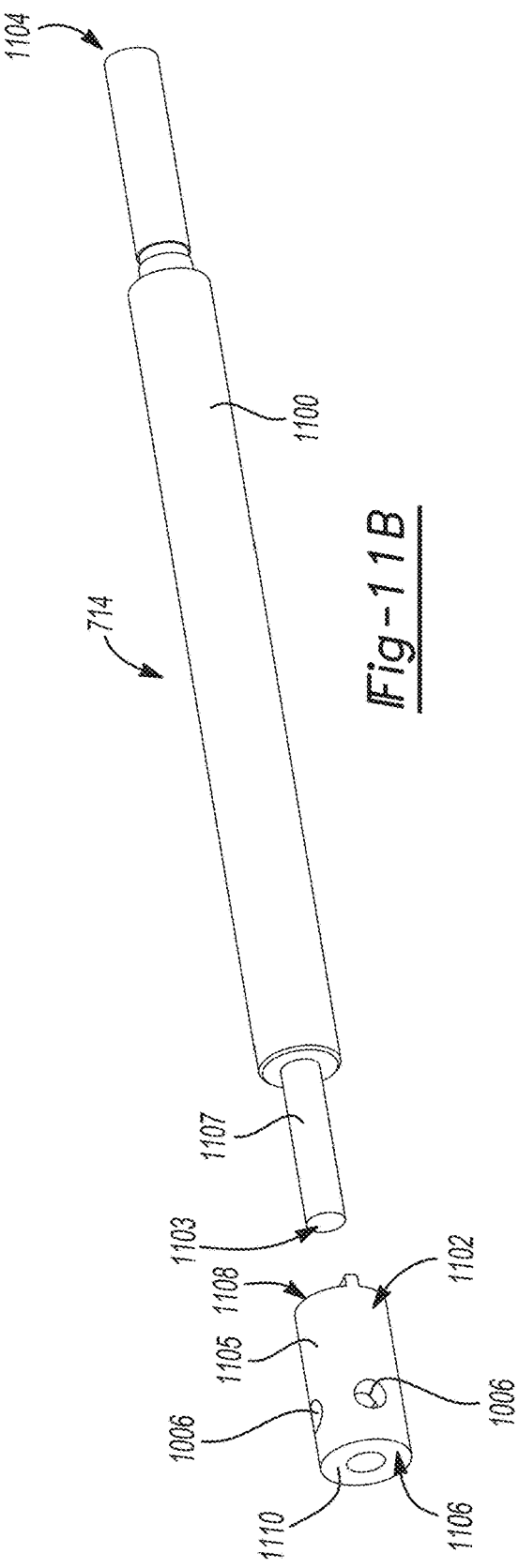
FIG. 11B is an exploded view of the shaft of FIG. 11A including an axle and a collar according to at least one example embodiment.

FIG. 11B is an exploded view of an axle and a collar of the shaft of FIG. 11A according to at least one example embodiment.

As shown in FIG. 11A, in at least one example embodiment, the shaft 714 includes an axle 1100 and a collar 1102 (also referred to as the "tubular collar 1102"). The axle 1100 may extend between a first end 1103 and a second end 1104 opposite the first end 1103 (shown in FIG. 11B).

In at least one example embodiment, the collar 1102 includes a sidewall 1105. The sidewall 1105 may be generally cylindrical. In at least one example embodiment, the sidewall 1105 may be a cylindrical sidewall. The sidewall 1105 may extend between a first end 1106 and a second end 1108 opposite the first end 1106. The sidewall 1105 of the collar 1102 may at least partially surround a portion of the axle 1100. In at least one example embodiment, the sidewall 1105 of the collar 1102 at least partially surrounds the first end 1103 of the axle 1100. For example, as shown in FIG. 11B, the first end 1103 of the axle 1100 may include an extension 1107. In at least one example embodiment, the extension 1107 may have a smaller diameter than the axle 1100. The extension 1107 may be configured to receive the collar 1102 such that the sidewall 1105 of the collar 1102 surrounds the extension 1107. In at least one example embodiment, an outer diameter of the extension 1107 may be the same as or similar to an inner diameter of the sidewall 1105. In at least one example embodiment, the first end 1106 of the collar 1102 may be closed. Accordingly, the collar 1102 may include an end wall 1110 at the first end 1106 of the sidewall 1105.

In at least one example embodiment, the collar 1102 is configured to rotate with the axle 1100. For example, in at least one example embodiment, the collar 1102 may define one or more protrusions 1112 at the first end 1108 of the collar 1102. In at least one example embodiment, the protrusion 1112 may be configured to engage a corresponding notch or recess in the axle 1100 to secure the collar 1102 to the axle 1100. In at least one other example embodiment, the collar 1102 and the axle 1100 may be a single unitary piece forming the shaft 714.

Figure 12:
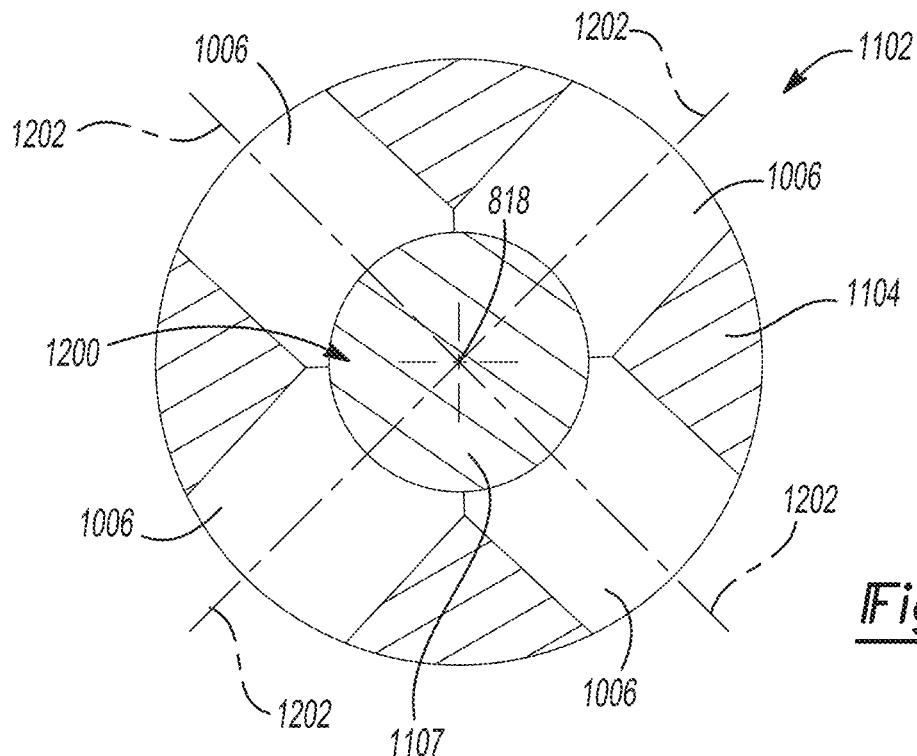
FIG. 12 is a cross sectional view of the shaft of FIG. 11A along line XII-XII of FIG. 11 according to at least one example embodiment.

FIG. 12 is a cross sectional view of the shaft of FIG. 11 along line XII-XII of FIG. 11A according to at least one example embodiment.

In at least one example embodiment, as shown in FIG. 12, the sidewall 1105 of the collar 1102 at least partially defines an interior region 1200 configured to receive at least the portion of the axle 1100, such as the extension 1107 of the axle 1100. In at least one example embodiment, the sidewall 1105 defines the pockets 1006. In at least one other example embodiment the sidewall 1105 defines a plurality of pockets 1006, as shown. Each of the plurality of pockets 1006 defines a central axis 1202 that is generally perpendicular to the shaft axis 818.

In at least one example embodiment, the plurality of pockets 1006 includes four pockets angularly spaced apart about a circumference of the collar 1102 and the shaft axis 818. Each of the plurality of pockets 1006 may be angularly spaced apart at a common axial location about the circumference of the collar 1102 and the shaft axis 818. In at least one example embodiment, each of the plurality of pockets 1006 may be angularly spaced equidistantly about the circumference of the collar 1102 and the shaft axis 818. For example, the plurality of pockets 1006 may include four pockets angularly spaced about 90° about the circumference of the collar 1102 and the shaft axis 818, as shown.

The shaft 714 may include one or more pockets 1006 (e.g., greater than or equal to two pockets 1006, greater than or equal to three pockets, greater than or equal to four pockets, greater than or equal to five pockets, or greater than or equal to six pockets). In at least one example embodiment, the plurality of pockets 1006 may include two pockets angularly spaced about 180° about the circumference of the collar 1102 and the shaft axis 818 (not shown). In at least one other example embodiment, the shaft 714 includes a single pocket 1006 (not shown). In at least one example embodiment, the plurality of pockets 1006 may include four or more pockets angularly spaced less than or equal to about 90° about the circumference of the collar 1102 and the shaft axis 818. In at least one example embodiment, the plurality of pockets 1006 may include four pockets or fewer pockets angularly spaced greater than or equal to about 90° about the collar 1102 and the shaft axis 818.

Figure 13:
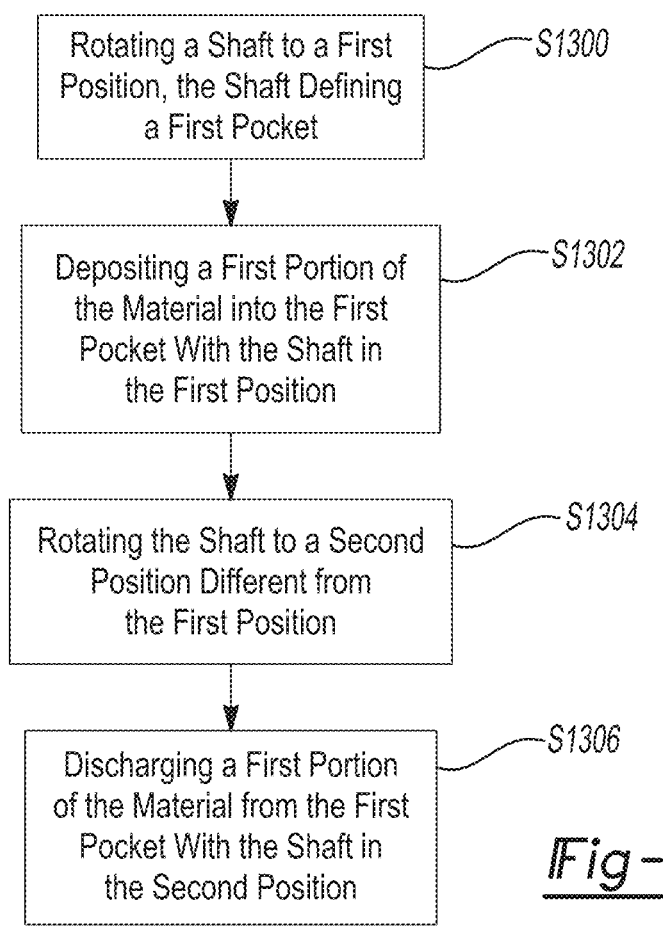
FIG. 13 is a flowchart depicting a method of dosing a loose material according to at least one example embodiment.

FIG. 13 is a flowchart depicting a method of dosing a loose material according to at least one example embodiment.

As shown in FIG. 13, in at least one example embodiment, the method generally includes rotating the shaft 714 to a first position, the shaft 714 defining a first pocket of the plurality of pockets 1006, at S1300; depositing a first portion of the loose material 800 into the first pocket of the plurality of pockets 1006 with the shaft 714 in the first position at S1302; rotating the shaft 714 to a second position different from the first position at S1304; and discharging the first portion of the loose material 800 from the first pocket of the plurality of pockets 1006 with the shaft 714 in the second position at S1306. Each of these steps is described in greater detail below.

At S1300, in at least one example embodiment, the method includes rotating the shaft 714 to the first position (i.e., a first angular position). As described in relation to FIG. 8, the first position may be such that the first pocket of the plurality of pockets 1006 of the shaft 714 is aligned and/or in fluid communication with the first opening 814 in the housing 716 and the aperture 810 in the hopper 702.

At S1302, in at least one example embodiment, the method includes depositing the first portion of the loose material 800 in the first pocket of the plurality of pockets 1006 with the shaft 714 in the first position. The agitator 802 may facilitate movement of the loose material 800 from the interior region 808 of the hopper 702 through the aperture 810 and the first opening 814 such that the first portion of the loose material 800 is deposited in the first pocket of the plurality of pockets 1006.

At S1304, in at least one example embodiment, the method includes rotating the shaft 714 to the second position (i.e., a second angular position) different from the first position. In at least one example embodiment, the rotating the shaft 714 to the second position includes rotating the shaft 180° or less. In at least one other example embodiment, the rotating the shaft to the second position includes rotating the shaft at 90° or less. Rotating the shaft 714 to the second position may retain the first portion of the loose material 800 within the first pocket of the plurality of pockets 1006 by engagement with an interior surface of the housing 716 at last partially surrounding the shaft 714.

At S1306, in at least one example embodiment, the method may include discharging the first portion of the loose material 800 from the first pocket of the plurality of pockets 1006 with the shaft in the second position. In at least one example embodiment, the first portion of the loose material 800 may be discharged from the first pocket of the plurality of pockets 1006 under the influence of gravity.

In at least one example embodiment, the method includes rotating the shaft 714 to the second position at S1304 and depositing a second portion of the loose material 800 into a second pocket of the plurality of pockets 1006 defined by the shaft 714. The first pocket and the second pocket of the plurality of pockets 1006 may be axially spaced apart along the shaft. In at least one example embodiment, the depositing of the second portion of the loose material 800 into the second pocket of the plurality of pockets 1006 is performed with the shaft 714 in the second position. In the second position, the second pocket of the plurality of pockets 1006 may be aligned with the first opening 814 in the housing 716 and the aperture 810 in the hopper 702. In at least one example embodiment, the discharging of the first portion of the loose material 800 at S1306 and the depositing of the second portion of the loose material 800 into the second pocket of the plurality of pockets 1006 is performed concurrently.

In at least one example embodiment, the method includes the rotating at S1300, the depositing at S1302, the rotating at S1304, and the discharging at S1306 to provide a desired (or alternatively, predetermined) quantity of doses. In at least one example embodiment, the desired quantity of doses corresponds to a plurality of pouches, as will be described in greater detail below in relation to FIG. 19.

Figure 14:
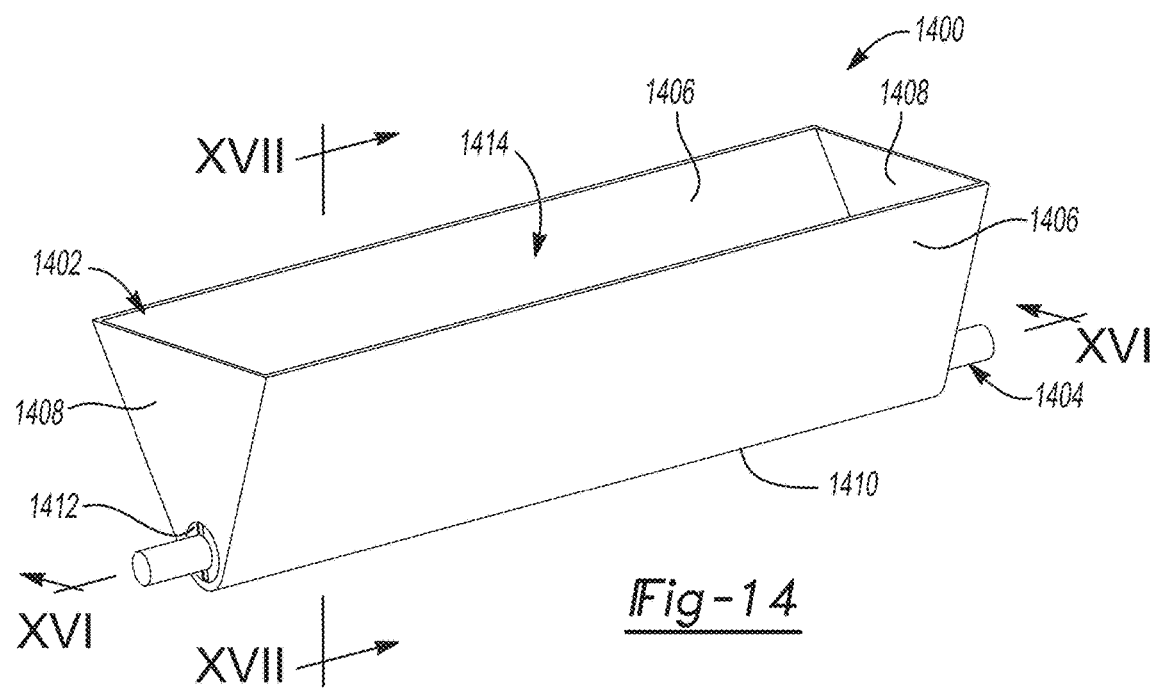
FIG. 14 is a top perspective view of an apparatus for dosing loose material according to at least one example embodiment.

FIG. 14 is a top perspective view of an apparatus for dosing loose material according to at least one example embodiment.

At least one example embodiment relates to an apparatus or station 1400 for dosing a loose material. The apparatus 1400 may be part of a pouching and/or packaging apparatus or used together with a pouching and/or packaging apparatus, as will be discussed in relation to FIGS. 19-20, below. The apparatus 1400 generally includes one or more hoppers 1402 for containing the loose material and one or more dosing assemblies 1404 to portion or dose the loose material. In at least one example embodiment, the apparatus 1400 includes a single hopper 1402, as shown. In at least one other example embodiment, one or more partitions or inner walls may extend between opposing portions of outer walls 1406 or sidewalls 1408 to define a plurality of hoppers 1402 (not shown).

In at least one example embodiment, the apparatus 1400 may include a single dosing assembly 1404 that is associated with a single hopper 1402, as shown. As shown in FIG. 14, the dosing assembly 1404 may be configured to extend through opposing apertures 1412 in the sidewalls 1408 adjacent to a floor 1410 and within an interior region 1414 of the hopper 1402. In at least one other example embodiment, the dosing assembly 1404 may extend under the floor 1410 and exterior to the hopper 1402 (not shown). In the at least one such example embodiment, the dosing assembly 1404 may include a sleeve or housing (not shown) configured to at least partially surround the dosing assembly 1404. The sleeve or housing may be similar to the housing 716

(shown in FIG. 7), except that it may have multiple axially-spaced sets of first and second openings.

Figure 15:
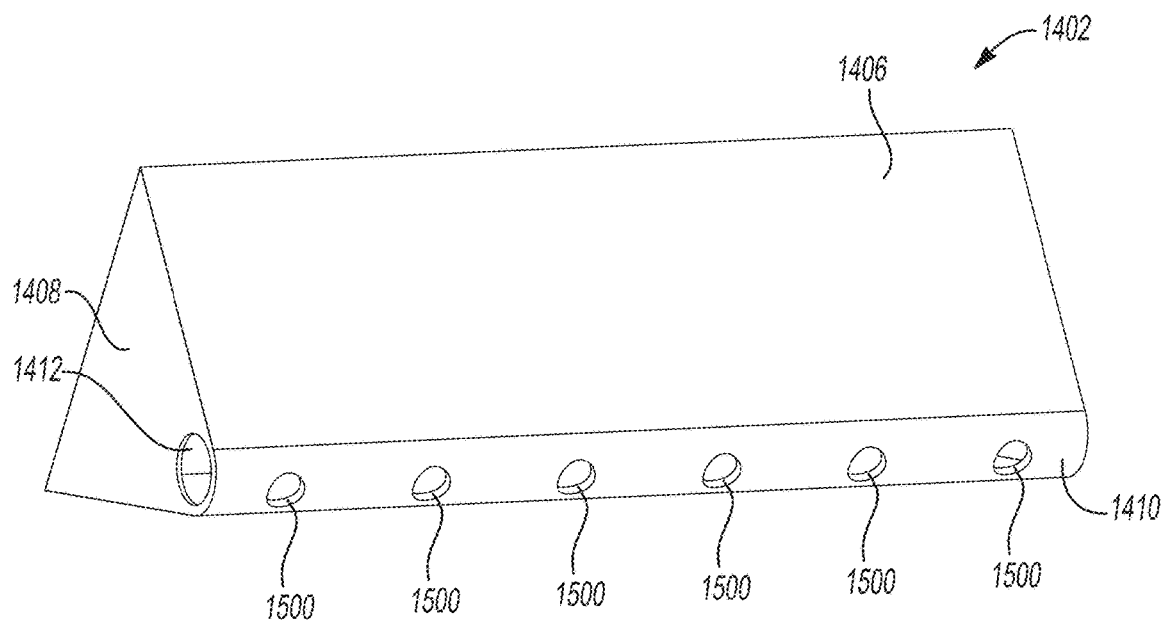
FIG. 15 is a bottom perspective view of a hopper of the apparatus of FIG. 14 according to at least one example embodiment.

FIG. 15 is a bottom perspective view of a hopper of the apparatus of FIG. 14 according to at least one example embodiment.

In at least one example embodiment, as shown in FIG. 15, the hopper 1402 may include a plurality of apertures 1500 in the floor 1410. The apertures 1500 may be configured to discharge the loose material from the hopper 1402, as will be described in greater detail below with respect to FIGS. 16-18.

Figure 16:
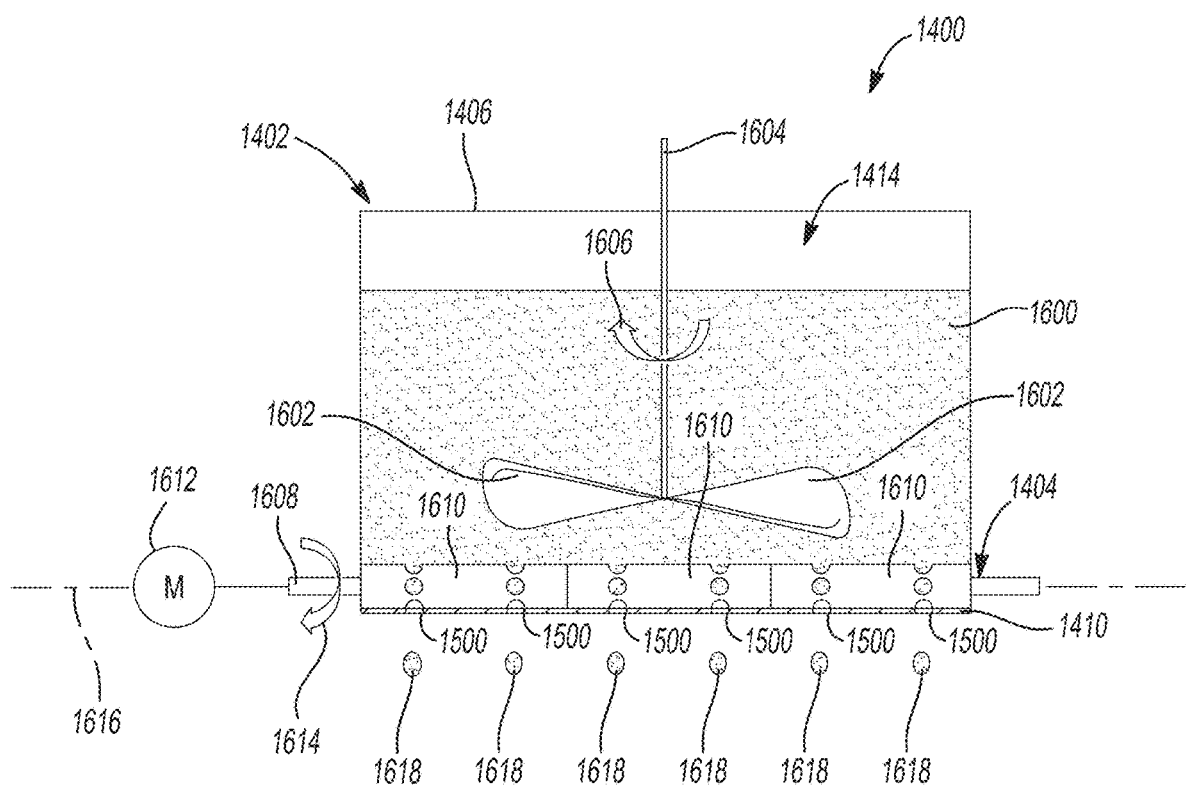
FIG. 16 is a front plan view of the apparatus of FIG. 14 at the cross section defined along line XVI-XVI of FIG. 14 according to at least one example embodiment.

FIG. 16 is a front plan view of the apparatus of FIG. 14 at the cross section defined along line XVI-XVI of FIG. 14 according to at least one example embodiment.

As shown in FIG. 16, the hopper 1402 may be configured to contain loose material 1600, as will be described in greater detail below in relation to FIGS. 19-20. A portion of the loose material 1600 may be in contact with an agitator 1602 connected to an agitator shaft 1604. The agitator shaft 1604 may be configured to rotate the agitator 1602 as indicated by 1606. The agitator shaft 1604 may be driven (e.g., rotated) by any suitable actuator, such as an electric motor (not shown). The agitator 1602 operates to break up the loose material 1600 held in the interior region 1414 of the hopper 1402. The agitator 1602 may also move the loose material 1600 from the interior region 1414 to be disposed in the dosing assembly 1404. In at least one other example embodiment, the loose material 1600 may be dispensed from the dosing assembly 1404 through the apertures 1500. Additionally or alternatively, the loose material 1600 may be dispensed though the apertures 1500 by another mechanism, such as under the influence of gravity.

In at least one example embodiment, the dosing assembly 1404 includes a shaft 1608 and one or more dosing collars 1610, as will be described in greater detail below in relation to FIG. 17. The shaft 1608 may be operatively connected to a motor 1612 such that the shaft 1608 and the dosing collars 1610 are configured to be rotated with respect to the hopper 1402 by the motor 1612, as shown at 1614. In at least one example embodiment, as shown, the apparatus 1400 may include a single motor 1614.

The motor 1612 may be configured to rotate the shaft 1608 and the dosing collars 1610 about a shaft axis 1616. The shaft 1608 and the dosing collars 1610 may be configured to move a portion of the loose material 1600 and discharge a desired (or alternatively, predetermined) portion 1618 of the loose material 1600 through the apertures 1500 in the floor 1410 of the hopper 1402, as shown in FIG. 15.

Figure 17:
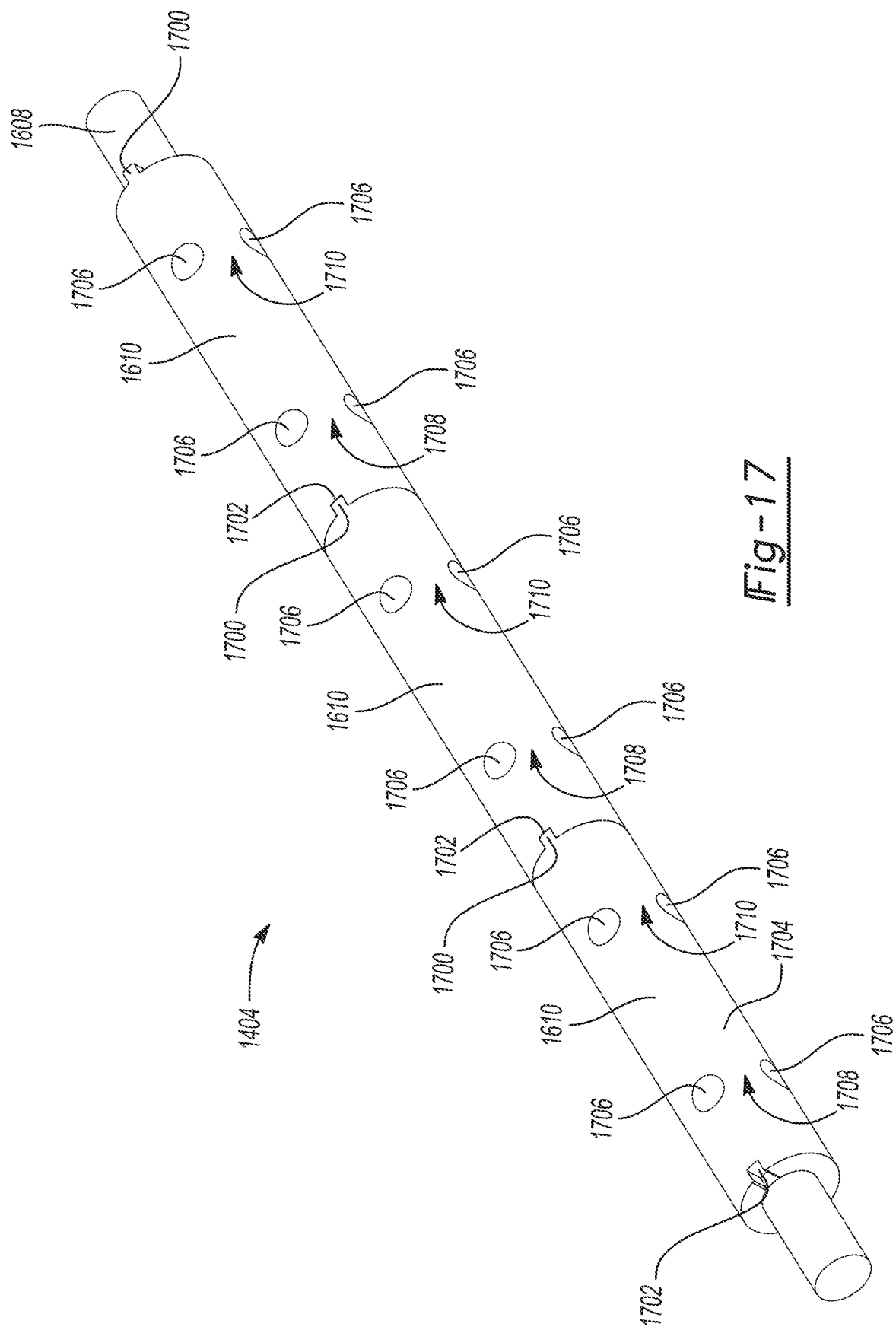
FIG. 17 is a perspective view of a shaft of a dosing assembly of FIG. 16 according to at least one example embodiment.

FIG. 17 is a perspective view of a shaft of a dosing assembly of FIG. 16 according to at least one example embodiment.

As shown in FIG. 17, in at least one example embodiment, the dosing assembly 1404 includes the shaft 1608 and the one or more dosing collars 1610 (also referred to as the "tubular collars 1610"). Each of the dosing collars 1610 may be axially positioned along the shaft 1608. In at least one example embodiment, each of the dosing collars 1610 are removably coupled to the shaft 1608. In at least one example embodiment, each of the dosing collars 1610 are configured to rotate together with the shaft 1608. For example, in at least one example embodiment, each of the dosing collars 1610 may define a protrusion 1700 at a first end of the dosing collar 1610 and a recess 1702 at a second end opposite the first end of the dosing collar 1610. The protrusion 1700 of a first one of the dosing collars 1610 may be configured to engage the recess 1702 of an adjacent, second one of the dosing collars 1610 such that each of the dosing collars 1610 on the shaft 1608 are interlocked. Additionally or alternatively, in at least one example embodiment, the shaft 1608 and the dosing collars 1610 may be a single unitary piece forming the dosing assembly 1404.

In at least one example embodiment, each of the dosing collars 1610 includes a sidewall 1704. The sidewall 1704 may be generally cylindrical. In at least one example embodiment, the sidewall 1704 may be referred to as a cylindrical sidewall. The sidewall 1704 may extend from a first end to a second end opposite the first end of the dosing collar 1610. The sidewall 1704 may be configured to at least partially surround the shaft 1608. In at least one example embodiment, the sidewall 1704 of the dosing collar 1610 defines a plurality of pockets 1706, as will be described below in relation to FIG. 17. Additionally or alternatively, in at least one other example embodiment, the dosing assembly 1404 may include one or more spacer collars (not shown) without pockets. The spacer collars may be positioned between dosing collars 1610.

In at least one example embodiment, each of the dosing collars 1610 may include one or more sets of the pockets 1706 axially spaced apart along a length of the dosing collar 1610. For example, as shown in FIG. 16, each of the dosing collars 1610 may include a first set of pockets 1708 and a second set of pockets 1710. The first set of pockets 1708 and the second set of pockets 1710 may be axially spaced apart on the dosing collar 1610. In at least one example embodiment, the first set of pockets 1708 may be angularly spaced apart at a first axial location and the second set of pockets 1710 may be angularly spaced apart at a second axial location different from the first axial location. Additionally or alternatively, in at least one other example embodiment, each of the dosing collars 1610 may include three or more sets of the plurality of pockets 1706 axially spaced apart.

Figure 18:
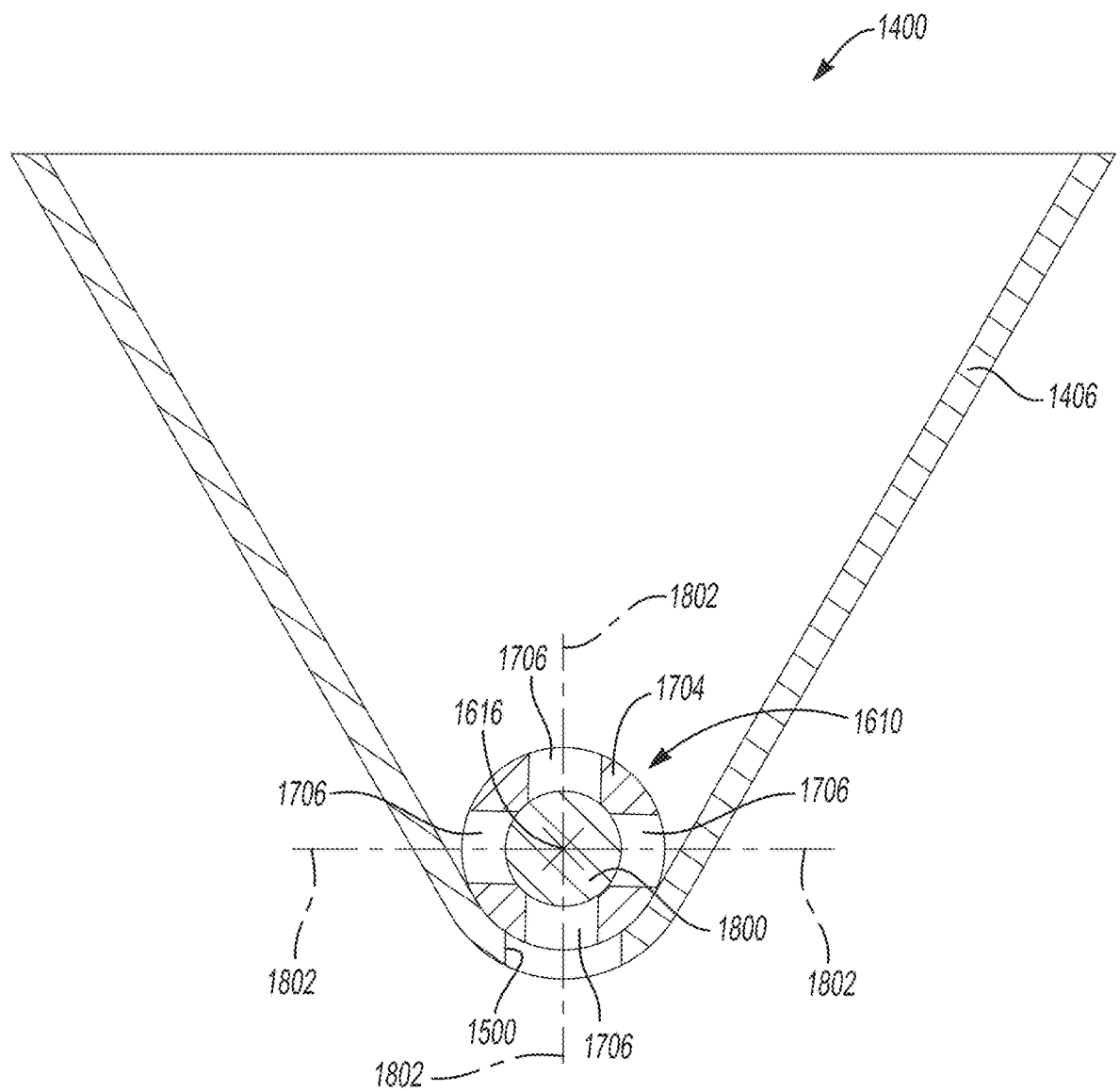
FIG. 18 is a cross sectional view of a dosing assembly of FIG. 14 along line XVIII-XVIII of FIG. 14 according to at least one example embodiment.

FIG. 18 is a cross sectional view of the dosing assembly of FIG. 14 along line XVIII-XVIII of FIG. 14.

As shown in FIG. 18, the sidewall 1704 of the dosing collar 1610 defines an interior region 1800 configured to receive at least a portion of the shaft 1608 (shown in FIG. 17). The sidewall 1704 also defines the plurality of pockets 1706. Each of the plurality of pockets 1706 define a central axis 1802 that is generally perpendicular to the shaft axis 1616 (shown in FIG. 16).

In at least one example embodiment, each set of the plurality of pockets 1706, such as the first set of pockets 1708 and the second set of pockets 1710 (shown in FIG. 17), includes four pockets angularly spaced apart about a circumference of the dosing collar 1610 and the shaft axis 1616 (shown in FIGS. 16-18). Each of the plurality of pockets 1706 may be angularly spaced apart at a common axial location about the circumference of the dosing collar 1610 and the shaft axis 1616. In at least one example embodiment, each of the plurality of pockets 1706 may be angularly spaced equidistantly about the circumference of the dosing collar 1610 and the shaft axis 1616. For example, the plurality of pockets 1706 may include four pockets angularly spaced 90° about the circumference of the dosing collar 1610 and the shaft axis 1616, as shown in FIG. 18. In at least one other example embodiment, the plurality of pockets 1706 may include two pockets angularly spaced about 180° about the circumference of the dosing collar 1610 and the shaft axis 1616. In still at least one other example embodiment, the plurality of pockets 1706 may include four or more pockets angularly spaced less than or equal to about 90° about the circumference of the dosing collar 1610 and the shaft axis 1616. In at least one other example embodiment, the plurality of pockets 1706 may include four pockets or less angularly spaced greater than or equal to about 90° about the dosing collar 1610 and the shaft axis 1616.

In at least one example embodiment, each of the plurality of pockets 1706 is configured to align with one or the apertures 1500 in the hopper 1402 as the shaft and the dosing collars 1610 rotate, as shown in FIG. 16. For example, each set of the plurality of pockets 1706, such as the first set of pockets 1708 and the second set of pockets 1710 shown in FIG. 17, may be configured to align with one of the apertures 1500 in the hopper 1402.

Figure 19:
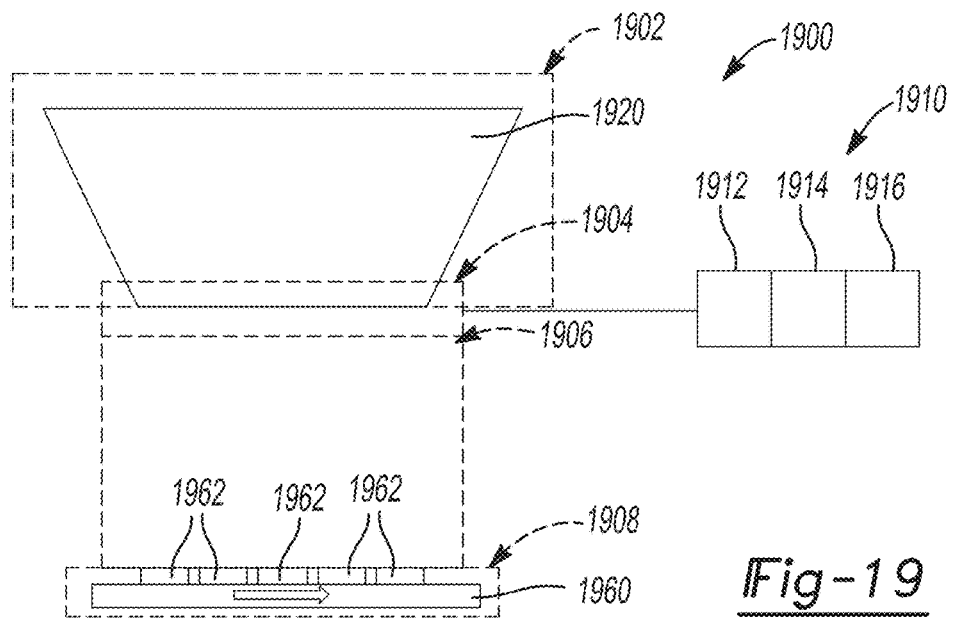
FIG. 19 is a schematic view of an apparatus for creating a plurality of oral products according to at least one example embodiment.

FIG. 19 is a schematic view of an apparatus for creating a plurality of oral pouch products according to at least one example embodiment.

In at least one example embodiment, as shown in FIG. 19, an apparatus 1900 for creating a plurality of pouches includes a material storage station 1902; a loose material dosing assembly or station 1904; a product forming station 1906; and a container loading station 1908; and a control system 1910. In at least one example embodiment, the control system 1910 includes a control interface 1912; a control circuitry 1914; and a memory 1916. In at least one example embodiment, an apparatus includes different or additional stations, such as a product metering station and/or an inspection station.

In at least one example embodiment, the material storage station 1902 may include a hopper 1920. The hopper 1920 may be the same as the hopper 102 (shown in FIGS. 1-2), the hopper 702 (shown in FIGS. 7-8), or the hopper 1402 (shown in FIGS. 14-16). In at least one example embodiment, the loose material dosing station 1904 may include the dosing assembly 104 (shown in FIGS. 1-2), the dosing assembly 704 (shown in FIGS. 7, 8, and 10), and/or the dosing assembly 1404 (shown in FIGS. 14 and 16-17).

In at least one example embodiment, the product forming station 1906 is configured to form a plurality of products. In at least one example embodiment, the product forming station is configured to form a plurality of oral products. In at least one example embodiment, the oral product is an oral tobacco product, an oral non-tobacco product, an oral *cannabis* product, or any combination thereof. The oral product may be in a form of loose material (e.g., loose cellulosic material), include loose material shaped material (e.g., oral pouch products), and/or be formed from loose material (e.g., plugs or twists, tablets, lozenges, chews, gums, films, any other oral product, or any combination thereof).

Where the oral product is an oral tobacco product including smokeless tobacco product, the smokeless tobacco product may include tobacco that is whole, shredded, cut, granulated, reconstituted, cured, aged, fermented, pasteurized, or otherwise processed. Tobacco may be present as whole or portions of leaves, flowers, roots, stems, extracts (e.g., nicotine), or any combination thereof.

In at least one example embodiment, the oral product includes a tobacco extract, such as a tobacco-derived nicotine extract, and/or synthetic nicotine. The oral product may include nicotine alone or in combination with a carrier (e.g., white snus), such as a cellulosic material. The carrier may be a non-tobacco material (e.g., microcrystalline cellulose) or a tobacco material (e.g., tobacco fibers having reduced or eliminated nicotine content, which may be referred to as "exhausted tobacco plant tissue or fibers"). In at least one example embodiment, the exhausted tobacco plant tissue or fibers can be treated to remove at least 25%, 40%, 50%, 60%, 70%, 75%, 80%, 85%, 90%, or 95% of the nicotine. For example, the tobacco plant tissue can be washed with water or another solvent to remove the nicotine.

In other example embodiments, the oral product may include *cannabis*, such as *cannabis* plant tissue and/or *cannabis* extracts. In at least one example embodiment, the *cannabis* material includes leaf and/or flower material from one or more species of *cannabis* plants and/or extracts from the one or more species of *cannabis* plants. The one or more species of *cannabis* plants may include *Cannabis sativa*, *Cannabis indica*, and/or *Cannabis ruderalis*. In at least one example embodiment, the *cannabis* may be in the form of fibers. In at least one example embodiment, the *cannabis* may include a cannabinoid, a terpene, and/or a flavonoid. In at least one example embodiment, the *cannabis* material may be a *cannabis*-derived *cannabis* material, such as a *cannabis*-derived cannabinoid, a *cannabis*-derived terpene, and/or a *cannabis*-derived flavonoid.

The oral product (e.g., the oral tobacco product, the oral non-tobacco product, or the oral *cannabis* product) may have various ranges of moisture. In at least one example embodiment, the oral product is a dry oral product having a moisture content ranging from 5% by weight to 10% by weight. In at least one example embodiment, the oral product has a medium moisture content, such as a moisture content ranging from 20% by weight to 35% by weight. In at least one example embodiment, the oral product is a wet oral product having a moisture content ranging from 40% by weight to 55% by weight.

In at least one example embodiment, oral product may further include one or more elements such as a mouth-stable polymer, a mouth-soluble polymer, a sweetener (e.g., a synthetic sweetener and/or a natural sweetener), an energizing agent, a soothing agent, a focusing agent, a plasticizer, mouth-soluble fibers, an alkaloid, a mineral, a vitamin, a dietary supplement, a nutraceutical, a coloring agent, an amino acid, a chemesthetic agent, an antioxidant, a food-grade emulsifier, a pH modifier, a botanical, a tooth-whitening agent, a therapeutic agent, a processing aid, a stearate, a wax, a stabilizer, a disintegrating agent, a lubricant, a preservative, a filler, a flavorant, flavor masking agents, a bitterness receptor site blocker, a receptor site enhancers, other additives, or any combination thereof.

Figure 20:
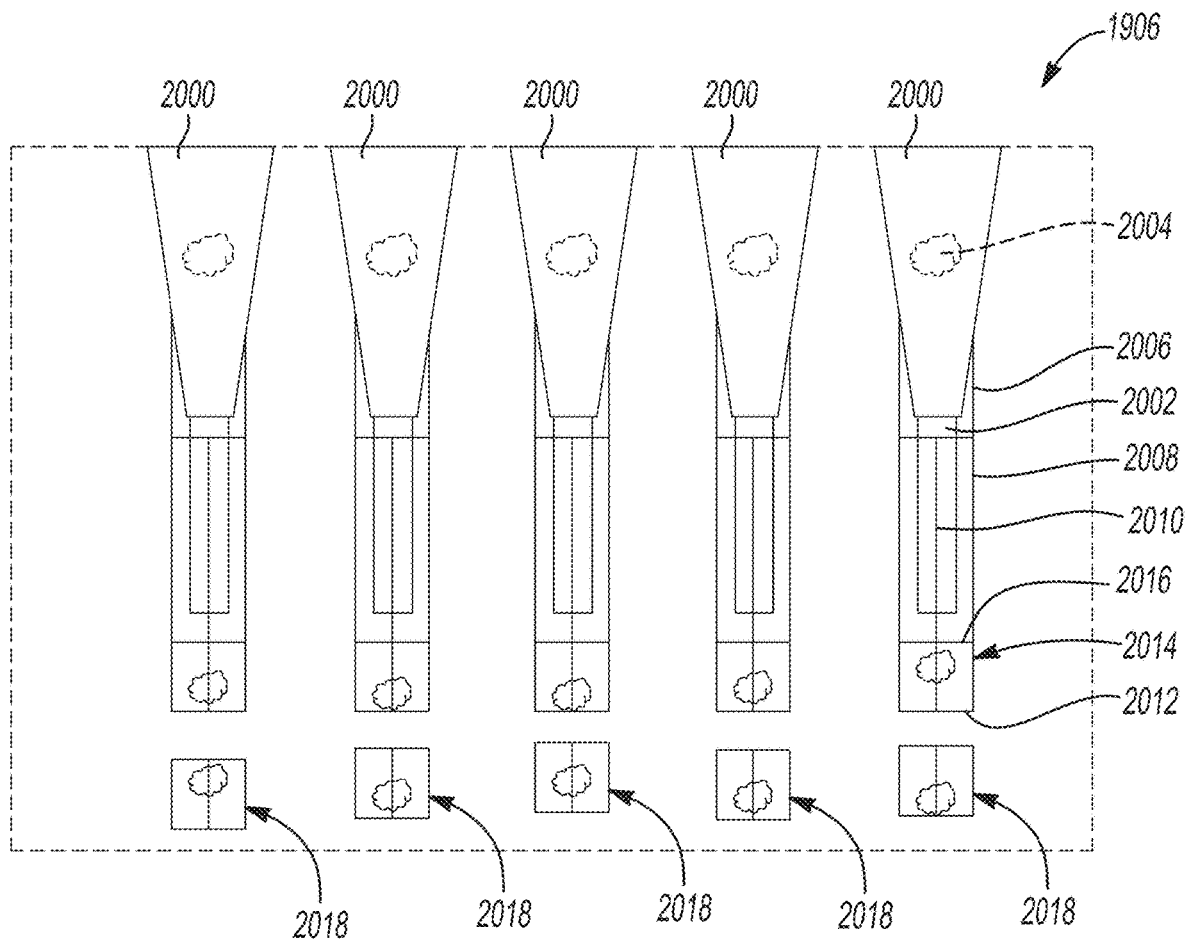
FIG. 20 is a schematic view of a product forming station of the apparatus of FIG. 19 according to at least one example embodiment.

FIG. 20 is a schematic view of a product forming station of the apparatus of FIG. 20 according to at least one example embodiment.

In at least one example embodiment, as shown in FIG. 20, the product forming station 1906 includes a plurality of funnels 2000 and a respective plurality of tubes 2002. The funnels 2000 may be configured to receive loose material from the dosing assembly 1904. The tubes 2002 may be configured to receive the loose material 2004 from the respective funnels 2000.

A fabric 2006 may be wrapped around the tube 2002 to form fabric tube 2008. Overlapping edge portions of the fabric tube 2008 may be sealed together (e.g., by heat sealing and/or pinch rollers) to form a first or longitudinal seal 2010. A second seal 2012 may be formed along the fabric tube 2008 to form a bottom of a partially-formed pouch 2014. The loose material 2004 from the dosing assembly 1904 may be loaded into a top of the partially-formed pouch 2014. The fabric 2006 may be advanced and a third seal 2016 may be formed along the fabric tube 2008. The third seal 2016 may form the top of the partially-formed pouch 2014 and a bottom of a subsequent pouch. Pouches 2018 may be separated from the fabric tube 2008 concurrently with or after forming the third seal 2016.

In at least one example embodiment, the fabric 2006 may be formed from a material that is generally recognized as safe ("GRAS") for use and/or contact with food. The material may be stain resistant, water permeable, and/or porous.

In at least one example embodiment, the fabric 2006 includes a non-woven material. The non-woven material may be formed of a polymer, including one or more synthetic and/or natural polymers. For example, fabric 2006 may be formed of a mesh material formed of spun or melt-blown fibers, such as polyurethane fibers as described in U.S. Pat. Nos. 10,448,669, 10,463,070, and/or 9,414,624, the entire contents of each of which is incorporated herein by reference thereto. The mesh material may be at least partially elastomeric.

In at least one other example embodiment, the fabric 2006 includes a paper. For example, the fabric 2006 can be formed of a cellulose fiber material, such as tea bag material or other materials typically used to form snus pouches. In at least one example embodiment, the fabric 2006 is formed of a hydrophobic paper or material. The hydrophobic paper may be formed of a cellulosic material. The hydrophobic paper may be non-woven material and may include any hydrophobic materials. The hydrophobic materials may be synthetic materials and/or semi-synthetic materials. The hydrophobic materials may include viscose, rayon, lyocell, and/or modal fibers. The fabric 2006 may be treated to make the fabric 2006 hydrophobic. In other example embodiments, the hydrophobic material may be a woven material.

Returning to FIG. 19, in at least one example embodiment, the container loading station 1908 includes a conveyor 1960. The conveyor 1960 may be configured to provide a plurality of containers 1962 to receive oral products from the product forming station 1906.

In at least one example embodiment, the control interface 1912 may be configured to receive control commands, including commands provided by an operator based on manual interaction with the control interface 1912. The control interface 1912 may be a manual interface, including a touchscreen display interface, a button interface, a mouse interface, a keyboard interface, any combination thereof, or the like. Control commands received at the control interface 1912 may be forwarded to the control circuitry 1914, and the control circuitry 1914 may execute one or more programs of instruction, for example to adjust operation of one or more portions of the apparatus 1900, based on the control commands.

In at least one example embodiment, memory 1916 may be configured to store information and look-up tables including desired (or alternatively, predetermined) values (e.g., angle of repose for different loose materials 1934; number of containers 1962 on conveyor 1960 prior to operation of container loading station 1908; weight range for a container 1962 loaded with pouches 1948; and/or any other suitable values or ranges).

The control circuitry 1914 according to one or more example embodiments may be implemented using hardware, or a combination of hardware and software. Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform (e.g., execute) the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiment described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiment, or they may be known devices that are altered and/or modified for the purposes of example embodiment.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software may include a computer program, program code, instructions, or some combination thereof, for independently or collectively instructing or configuring a hardware device to operate as desired. The computer program and/or program code may include program or computer-readable instructions, software modules, data files, data structures, and/or the like, capable of being implemented by one or more hardware devices, such as one or more of the hardware devices mentioned above. Examples of program code include both machine code produced by a compiler and higher level program code that is executed using an interpreter.

Software and/or data may be embodied permanently or temporarily in any type of machine, element, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media or memory 1916 discussed herein.

I claim:

1. An apparatus comprising:
   a shaft configured to rotate, the shaft defining a pocket and including, an axle, and
      a tubular collar at least partially surrounding the axle and defining the pocket; and
   a housing including,
      a sidewall at least partially defining an interior region, at least a portion of the shaft in the interior region, the sidewall defining a first opening to the interior region.

2. The apparatus of claim 1, wherein the shaft defines a plurality of pockets, the plurality of pockets including the pocket.

3. The apparatus of claim 2, wherein the shaft includes the plurality of pockets equally spaced apart about a circumference of the shaft.

4. The apparatus of claim 2, wherein the shaft is configured such that as the shaft rotates each of the plurality of pockets comes into fluid communication with the first opening.

5. The apparatus of claim 1, wherein the pocket is an aperture.

6. The apparatus of claim 1, wherein
   the tubular collar includes a plurality of tubular collars, and
   the plurality of tubular collars are axially positioned along the axle.

7. The apparatus of claim 6, wherein each of the plurality of tubular collars is interlocked with another of the plurality of tubular collars.

8. The apparatus of claim 6, wherein the plurality of tubular collars are removably coupled to the axle.

9. The apparatus of claim 1, wherein
   the shaft defines a plurality of pockets including the pocket, and
   the plurality of pockets includes a first set of circumferentially-spaced pockets at a first axial location and a second set of circumferentially-spaced pockets at a second axial location different from the first axial location.

10. The apparatus of claim 1, wherein the tubular collar is fixed to the axle and configured to rotate together with the axle.

11. The apparatus of claim 1, wherein
    the housing is a hopper,
    the sidewall defines a triangular cross section, and
    the shaft is at a vertex of the triangular cross section.

12. An apparatus comprising:
    a shaft configured to rotate, the shaft defining a pocket, the shaft including,
       an axle, and
       a tubular collar at least partially surrounding the axle and defining the pocket; and
    a housing including,
       a cylindrical sidewall at least partially defining an interior region, at least a portion of the shaft in the interior region, the cylindrical sidewall defining a first opening to the interior region and a second opening to the interior region, the apparatus being configured such that as the shaft rotates, the pocket sequentially comes into fluid communication with the first opening and the second opening.

13. The apparatus of claim 12, wherein the shaft defines a plurality of pockets, the plurality of pockets including the pocket.

14. The apparatus of claim 13, wherein the shaft includes the plurality of pockets equally spaced apart about a circumference of the shaft.

15. The apparatus of claim 13, wherein the shaft is configured such that as the shaft rotates each of the plurality of pockets comes into fluid communication with the first opening.

16. The apparatus of claim 12, wherein the pocket is an aperture.

17. The apparatus of claim 12, wherein
    the tubular collar includes a plurality of tubular collars, and
    the plurality of tubular collars are axially positioned along the axle.

18. The apparatus of claim 17, wherein each of the plurality of tubular collars is interlocked with another of the plurality of tubular collars.

19. The apparatus of claim 17, wherein the plurality of tubular collars are removably coupled to the axle.

20. The apparatus of claim 12, wherein the tubular collar is fixed to the axle and configured to rotate together with the axle.

21. An apparatus comprising:
    an axle configured to rotate through a first position and a second position; and a tubular collar coupled to the axle and configured to rotate together with the axle, the tubular collar defining a plurality of pockets, the plurality of pockets including,
a first set of pockets, the first set of pockets angularly spaced apart at a first axial location, and
a second set of pockets, the second set of pockets angularly spaced apart at a second axial location different from the first axial location.

22. The apparatus of claim 21, wherein the tubular collar includes the plurality of pockets angularly spaced apart at a common axial location.

23. An apparatus comprising:
a shaft configured to rotate, the shaft defining a plurality of pockets including,
a first set of circumferentially-spaced pockets at a first axial location, the first set of circumferentially-spaced pockets including a pocket, and
a second set of circumferentially-spaced pockets at a second axial location different from the first axial location; and
a housing including,
a cylindrical sidewall at least partially defining an interior region, at least a portion of the shaft in the interior region, the cylindrical sidewall defining a first opening to the interior region and a second opening to the interior region, the apparatus being configured such that as the shaft rotates, the pocket sequentially comes into fluid communication with the first opening and the second opening.

* * * * *